(12) United States Patent
Balogh

(10) Patent No.: US 6,999,071 B2
(45) Date of Patent: Feb. 14, 2006

(54) METHOD AND APPARATUS FOR DISPLAYING 3D IMAGES

(76) Inventor: Tibor Balogh, Ady Endre út 3a, H-1192, Budapest (HU)

(*) Notice: Subject to any disclaimer, the term of this patent is extended or adjusted under 35 U.S.C. 154(b) by 468 days.

(21) Appl. No.: 10/276,466

(22) PCT Filed: May 18, 2001

(86) PCT No.: PCT/HU01/00057

§ 371 (c)(1), (2), (4) Date: Mar. 4, 2003

(87) PCT Pub. No.: WO01/88598

PCT Pub. Date: Nov. 22, 2001

(65) Prior Publication Data

US 2003/0156077 A1  Aug. 21, 2003

(30) Foreign Application Priority Data

May 19, 2000 (HU) .................................... 0001974
Mar. 9, 2001 (HU) .................................... 0101027

(51) Int. Cl.
G09G 3/36 (2006.01)

(52) U.S. Cl. .......................... 345/419; 345/6; 345/653; 345/757; 345/848; 345/852; 349/8; 359/15; 359/23; 359/28; 359/31; 359/462; 352/198

(58) Field of Classification Search .................. 345/6, 345/419, 653, 757, 848, 852; 349/8; 359/15, 359/23, 28, 31, 462; 352/198
See application file for complete search history.

(56) References Cited

U.S. PATENT DOCUMENTS 4,717,949 A * 1/1988 Eichenlaub .................. 348/54
5,170,156 A * 12/1992 DeMond et al. ............... 345/85
5,515,076 A * 5/1996 Thompson et al. .......... 345/505

(Continued)

FOREIGN PATENT DOCUMENTS

EP    1 008 887 A1    6/2000

(Continued)

OTHER PUBLICATIONS

An in cockpit 'situation awareness' autostereoscopic avionics display, Jesse Eichenlaub and Todd Touris, SPIE vol. 2219 Cockpit Displays (1994), pp. 395-406.

*Primary Examiner*—Ricardo Osorio
*Assistant Examiner*—Vincent E. Kovalick
(74) *Attorney, Agent, or Firm*—Brooks Kushman P.C.

(57) ABSTRACT

The invention relates to a method for displaying three-dimensional images. In the method light beams ($L_e$) are associated to several different screen points (P) of a screen (20). The light beams ($L_e$) produce different views associated to different emission directions (E). The emission directions (E) are associated to the individual screen points (P). The light beams ($L_e$) are generated by projecting light beams ($L_d$), according to the angle of the adjacent emitting directions. According to the invention, light beams ($L_e$) without viewing direction information are generated, essentially simultaneously, with pixels ($C_d$) having different co-ordinates. These pixels ($C_d$) are pixels of a two-dimension display (50), and they are associated to different emitting directions (E) of the appropriate screen points (P). The light beams ($L_e$) produced by the pixels ($C_d$) of the display (50) with different co-ordinates are imaged simultaneously in different deflection directions (D), as a function of the co-ordinates of the pixels ($C_d$) producing the light beams ($L_e$). The subject of the invention is an apparatus implementing the above method.

31 Claims, 20 Drawing Sheets

U.S. PATENT DOCUMENTS

| | | | |
|---|---|---|---|
| 5,519,533 A | * 5/1996 | Nomura et al. | 359/478 |
| 5,694,235 A | * 12/1997 | Kajiki | 359/202 |
| 5,719,704 A | * 2/1998 | Shiraishi et al. | 359/558 |
| 5,801,761 A | 9/1998 | Tibor | |
| 6,049,374 A | * 4/2000 | Komatsuda et al. | 355/67 |
| 6,050,689 A | * 4/2000 | Nakamura et al. | 353/31 |
| 6,157,474 A | * 12/2000 | Orr et al. | 359/23 |
| 6,201,565 B1 | 3/2001 | Balogh | |
| 6,736,512 B1 | 5/2004 | Balogh | |
| 2001/0028356 A1 | 10/2001 | Balogh | |
| 2003/0058209 A1 | 3/2003 | Balogh | |

FOREIGN PATENT DOCUMENTS

| | | |
|---|---|---|
| GB | 2 272 597 A | 5/1994 |
| WO | WO 94/23541 | 10/1994 |
| WO | WO 98/34411 | 8/1998 |

* cited by examiner

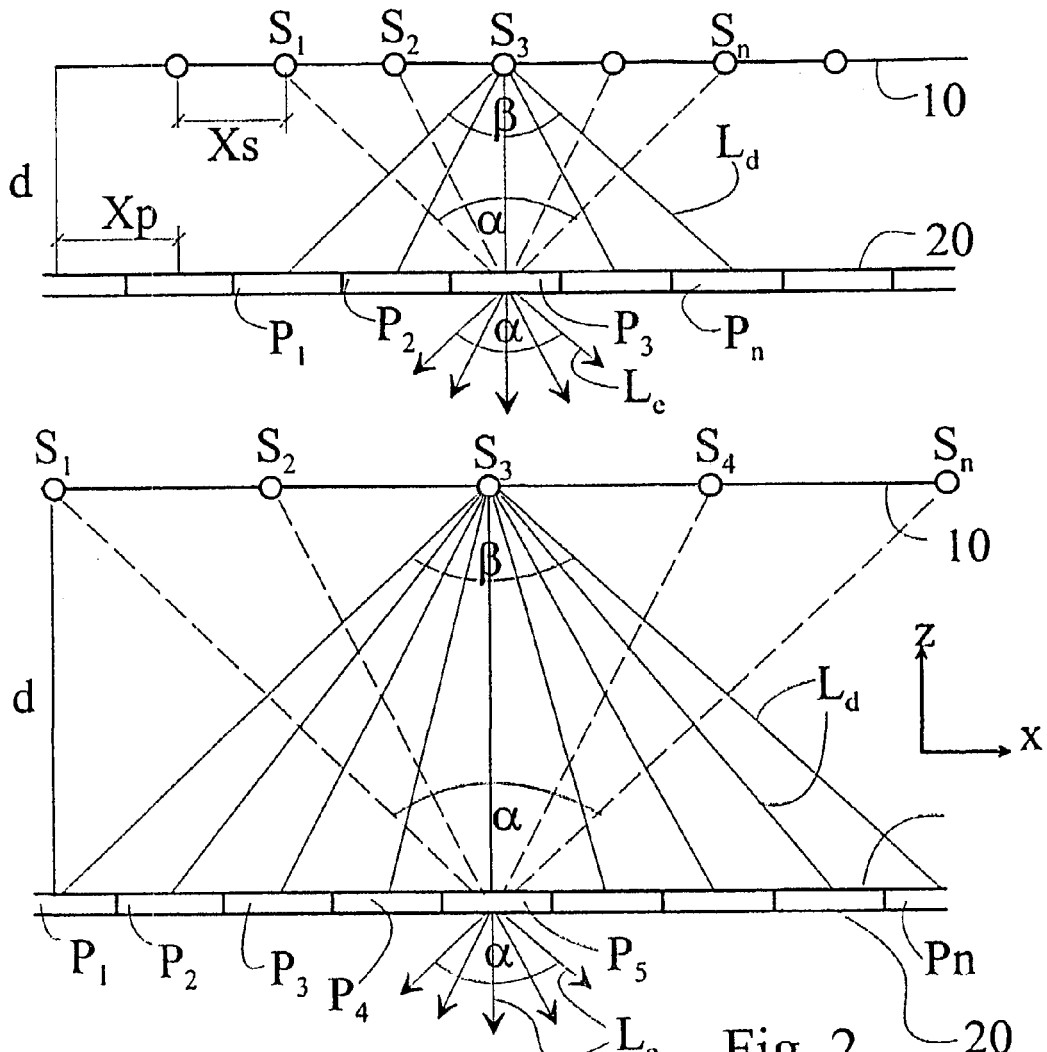
Fig. 1
Fig. 2
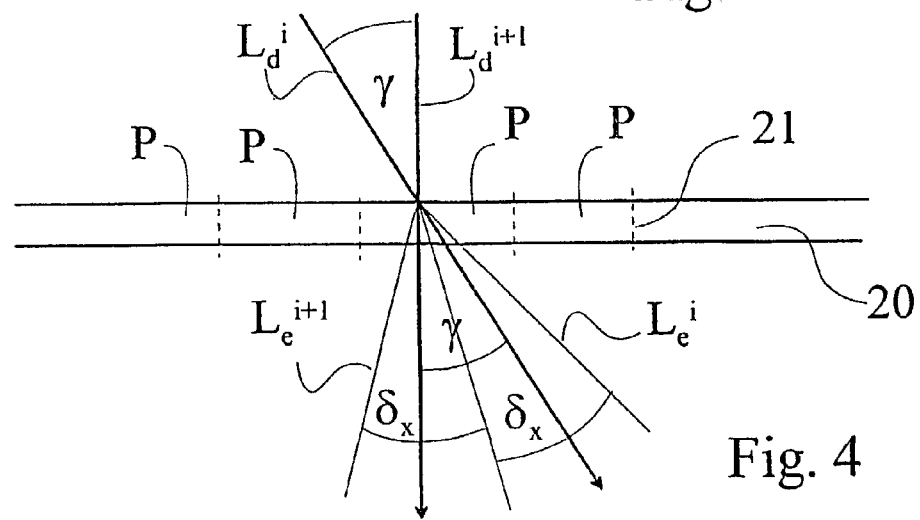
Fig. 4

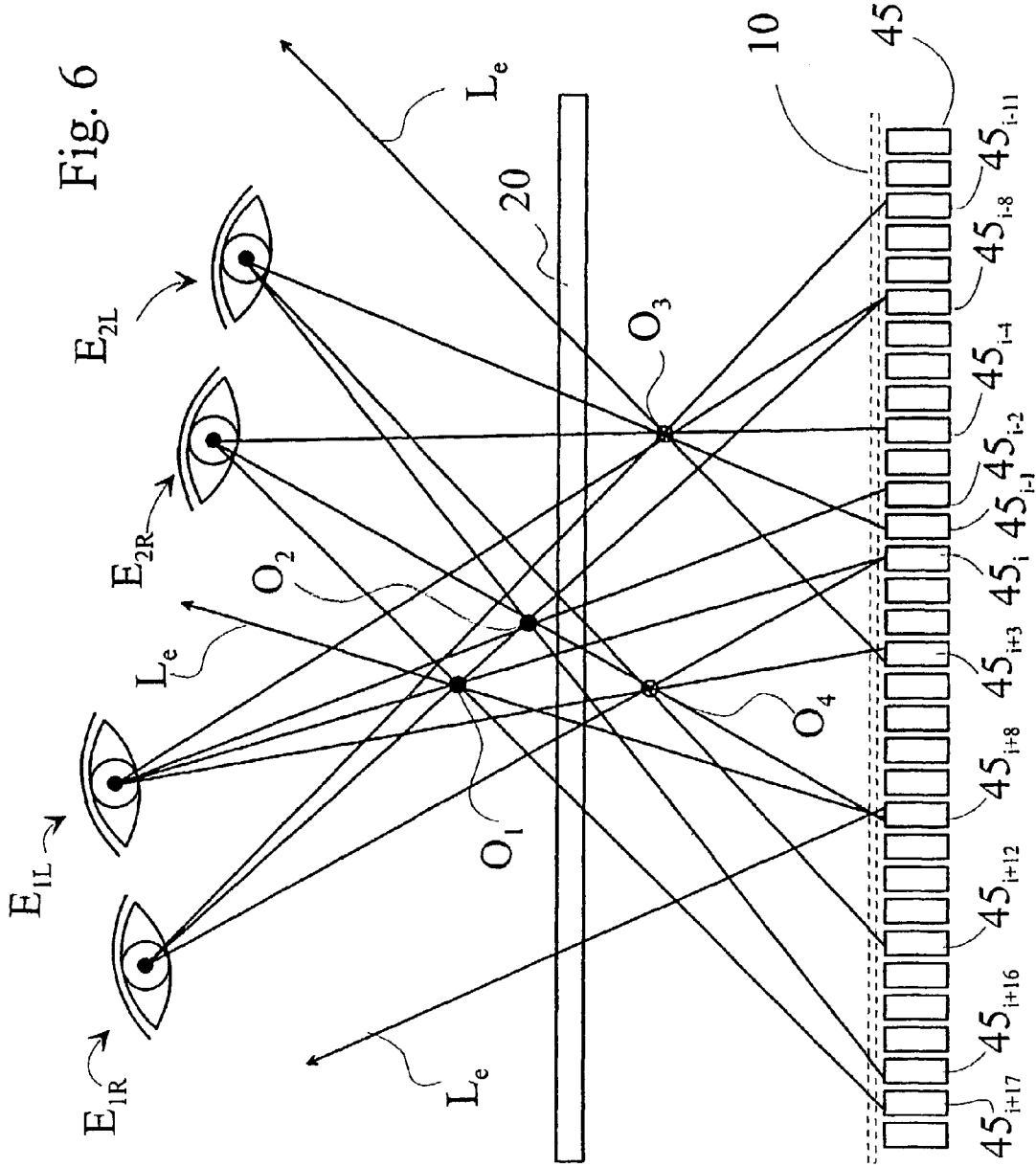

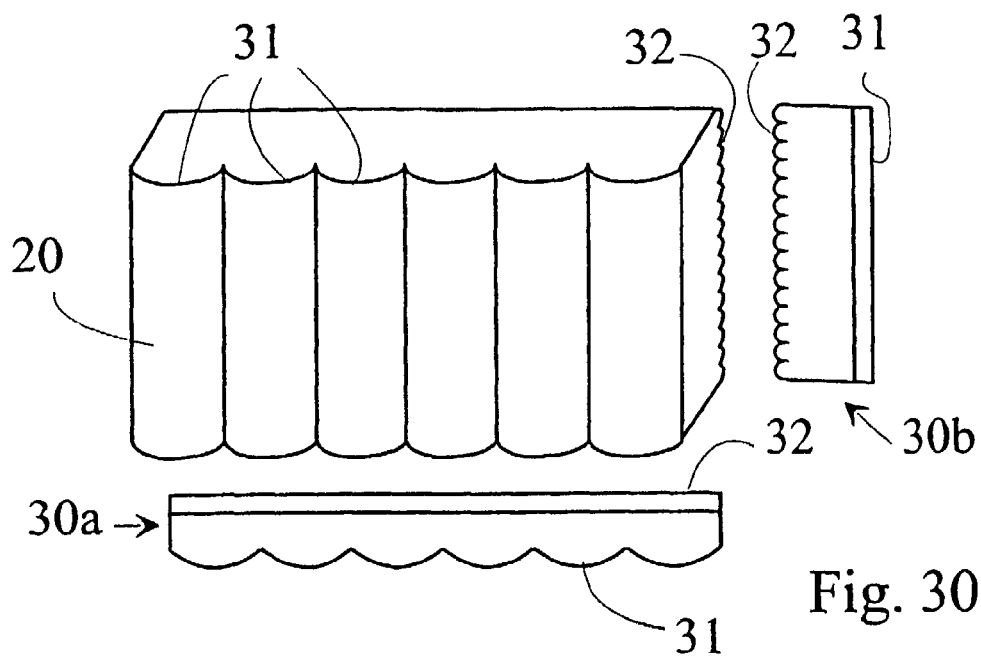
Fig. 30
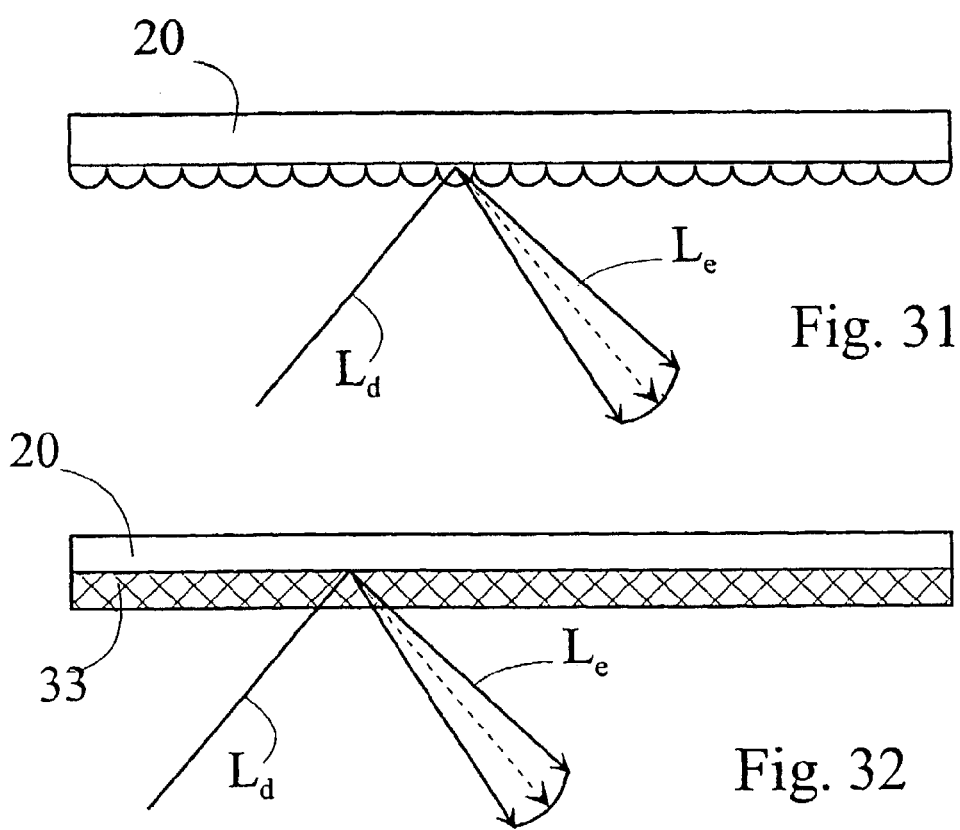
Fig. 31
Fig. 32

METHOD AND APPARATUS FOR DISPLAYING 3D IMAGES

TECHNICAL FIELD

The invention relates to a method for displaying 3D images, in the course of which light beams associated to multiple different points of a screen and light beams creating different views associated to different emitting directions of the individual screen points are generated, and the light beams thus generated are projected onto a directionally selective transmitting and/or reflecting screen. The subject of the invention also relates to the apparatus implementing the method of the invention. The apparatus comprises a screen for direction selectively transmitting and/or reflecting light, and a screen illuminating system. The screen illuminating system comprises modules for generating light beams; the light beams being associated to multiple different points of the screen, and to different emitting directions of the points of the screen. The modules are controlled by an appropriate control system.

BACKGROUND ART

Three dimensional (3D) imaging methods based on the above principles are described in detail in the documents no. WO 94/23541 and WO98/34411, the contents of which is presumed to be known for understanding the present invention. 3D images contain more information than 2D images. To display a 3D image, an appropriate number of screen points (spots) must be generated, and, in the case of a moving image, taking into consideration the change of the frames, an appropriate spot/sec ratio must be generated as well. The number of screen points (spots) is basically the product of the image resolution and the angle resolution (that is, the number of distinguishable views or viewing zones). In addition, in the case of a moving image, the number of screen points required within one single frame must be multiplied by the number of frames changed in one second (frame/sec), thus giving the number of screen points to be generated every second.

The basic problem is how to generate the required number of imaging screen points (spots) within a given unit of time (spot/sec):

One possible solution is to perform the multiplication with the time; in which case faster devices are needed, as it is described in U.S. Pat. No. 6,157,424. Such a device is not yet available in practice, or is only able to display a limited number of views. These devices apply fast LCD screens or other fast light valves, placed in two or three subsequent planes.

The second solution is spatial division, that is, the required number of screen points are generated paralelly and appropriately organised. In practice, displays of normal speed must be used, but with a greater number of pixels (high resolution), or more displays with normal resolution. The disadvantage of this approach is that it requires more space. Such are lenticular systems, where different directions are created at the expense of resolution; for example, to create ten directions a device with a 10-fold resolution is needed, where every tenth screen point is associated to a certain direction, or, alternatively, a screen (display) is divided into ten parts. Different versions of these solutions are now known.

The third possibility is to combine the two methods, making optimal use of the speed and resolution of the devices, taking into consideration the technological features and limitations of the screen point generating element; for example, for generating 30 views, ten pieces of triple-speed devices or with a ten-fold resolution are applied. The spatially separated the 10-fold number of screen points is divided in time by 3 different light sources—typically from different directions.

The present invention describes a method and apparatus, which meet the above requirements, with a method that can be realised with real, existing technologies, based on the second and third solutions.

The purpose of the present invention is to provide an improved method and apparatus which can produce high quality colour images with adequately high frame frequency, that is, which makes it possible to produce moving 3D colour images, as well. To solve this task, the invention basically requires a new optical arrangement.

An important element of the known 3D imaging systems described above is a relatively small light source emitting light beams of varying intensity (and preferably of different colours) in different directions. In document no. WO 98/3441 this is created through an acousto-optical deflector which deflects and modulates a laser beam as a function of time. Thus light beams are generated and emitted in different directions, and these light beams are differently modulated in different directions.

SUMMARY OF THE INVENTION

According to the invention, these light beams arc generated in a manner different from the known methods. In the method according to the invention, light beams substantially without emitting direction information are generated, substantially simultaneously, with the pixels of a two-dimensional display, where the pixels have different co-ordinates. The light beams are associated to the different points on the screen, and correspond to the different emitting directions of the screen points.

The light beams generated by the display pixels with different co-ordinates are imaged substantially simultaneously into different deflecting directions. The imaging is performed as a function of the co-ordinates of the pixels generating the light beams.

In a preferred implementation of the method, the light beams projected in different directions towards the screen points are created by generating a composite image. This composite image comprises such image details, which correspond to the images to be projected into different directions from the different screen points. The composite images are illuminated with substantially parallel light beams. The generated substantially parallel light beams are modulated with the intensity and/or colour information of the individual image details. The modulated substantially parallel light beams are projected onto an optical deflecting means, preferably onto an imaging optics, e.g. an objective lens with a large angle of incidence. The projecting is performed in the function of the spatial coordinates. The substantially parallel light beams, which are modulated with the image details of the composite image, are projected with the optical deflecting means towards the appropriate screen points. The projection is performed by deflecting the light beams into different directions. The deflection is made according to the position of the relevant image details on the composite image, and the imaging properties of the optical deflecting element. In this manner the appropriate screen points are defined by the mutual position of the relevant modules (comprising the relevant optical deflecting means) and the screen.

The subject of the invention is also an apparatus for the display of three-dimensional images, as described in the introduction. The apparatus comprises a screen for direction selectively transmitting and/or reflecting light, and a screen illuminating system. According to the invention, the modules further comprise a two-dimensional display, and an optical system for simultaneously imaging the individual pixels of the display onto the screen. The display pixels on the two-dimensional display are associated to the different points on the screen, and at the same time correspond to the different emitting directions, the emitting directions also being associated to the different screen points. The display pixels generate substantially simultaneously light beams with different co-ordinates but substantially without emitting direction information. The imaging optics associated to the display substantially simultaneously images the light beams generated by the display pixels with different co-ordinates into different emitting directions or imaging directions.

Preferably, the screen transmits the incoming light beams substantially without changing their direction or reflects the light beams in a mirror-like manner or retroreflectively. At the same time, the modules are realised as means for generating light beams, which are then emitted in different directions from the screen points. For this purpose, the modules project light beams with different intensity and/or colour towards the individual screen points from different directions. Thus in the means for projecting light beams towards the screen points, the two dimensional display functions as an image generating means for generating a composite image, where the composite image is composed of the image details to be projected into the different emitting directions from the different screen points. Hereafter such a composite image is also termed as a module image, because it is normally generated by the display of a module. The imaging optics of the apparatus also comprises means for deflecting the light beams incoming onto the imaging optics with a given angle, so that this deflection angle is a function of the incoming co-ordinates of the light beam. The imaging optics preferably comprises an optical lens.

At the same time, the illuminating system is provided with means for generating substantially parallel, and—as a function of the spatial co-ordinates—substantially homogenous light beams for illuminating the image generating means.

In the optical system the modules are positioned relative to each other and to the screen, so that the light beams, which are coded with the pixels of a composite image—preferably by modulating with colour—and intensity information—are deflected by the optical deflecting means towards the different deflection directions and towards the appropriate screen points, according to the mutual position of the relevant modules and the screen.

The screen, on the other hand, provides an appropriate light divergence, according to the angle between the light beams projected on the same screen point from the adjacent modules. The divergence is provided in a plane determined by the light beams.

Preferably, the image generating means is a micro-display. The integrated circuit technology has made the production of the above devices in smaller size—practically in the size of an IC—usually with a pixel size of 10–15 microns with higher resolution and at lower costs. This makes recommended large number parallel operating micro-display based systems/apparatus feasible.

With one of the proposed embodiments, the two-dimensional display is also a ferroelectric liquid crystal microdisplay (FLC microdisplay). These are available in small sizes, colour version and in large numbers. However, their size is still larger than the characteristic distance of the screen points of the screen. Therefore, for a preferable realisation of the invention we recommend the use of fewer two-dimensional displays than the number of screen points of the screen. A further problem is caused by the effective area of the displays always being smaller than their entire area. In the case of some optical arrangements the physical size of the displays determines the number of emitting directions, that is the angle resolution of the apparatus. In order to increase the number of the emitting directions, the two-dimensional displays are positioned in several parallel rows and shifted parallel to the rows compared to each other. This way a virtually united, long display is obtained, which can provide a high angle resolution three-dimensional image, with good depth of field, and the horizontal resolution of the displays can also be fully exploited.

It has also proven practical for the apparatus to contain several devices producing essentially parallel light beams, which have a common light source, preferably any intensive light source, mirror light bulbs or metal-halide lamps. This way the light of the common light source is directed to the individual optical deflection devices through optical fibres. This significantly simplifies the structure of the lighting system, the distribution of the light to the large number of modules, and the light source can be placed further from the lenses and its cooling can be better implemented.

The continuous appearance of the three-dimensional image from any direction is served by the solution of using an optical plate, which functions as the screen for providing divergence to the direction selectively transmitted or reflected light. The divergence of the optical plate is preferably provided by a lens system or a holographic layer.

It is also viable in some applications that the screen provides a retroreflective surface. This arrangement is advantageous, when the observer of the three-dimensional image moves in a relatively narrow space and the different views are to be created within that space only.

For example, if the screen is located somewhere on a circle which is essentially concentric with a circle created by the modules, then the three-dimensional image is mainly visible in the area around the centre of the circles, but has a very good directional resolution in that area. This means that the change of the view is also perceptible if the observer moves only slightly.

The invention eliminates the theoretical disadvantage of known systems operating on a three-dimensional parallel display theory in that it uses significantly smaller image point generating means than the final 3D (complex) image. The image point generating means are used in an appropriate geometry. This can help avoid the sub-pixel structure that lead to bad filling (the so-called stadium display or fence effect, resolution reduction, etc.). Light passes light beams without obstacle and is emitted from the same (screen) point instead, when using the image generating method in accordance with the invention.

A technological limitation of traditional display systems is how to achieve high lamp power: the light intensity that can be concentrated on the LCD panel poses a limit for the largest lamp power projectors, while smaller projectors can also use high performance light sources to produce images visible in average illumination with all its known consequences, such as cooling, etc.

In the ease of the apparatus based on a large number of microdisplays in accordance with the invention the above obstacle can be overcome. Complex, high light power 3D images can be generated, so that the limited light bearing capacity LCD panels have to transmit and/or reflect lower light intensity in proportion to their number, i.e. in the case of a 100 panel system the light intensity is only one one-hundredth. On the other hand, it is possible to produce images with similar brightness as with traditional apparatus by using several, lower brightness, but effective light sources, such as LEDs due to the parallel distribution structure.

Preferably, the apparatus according to the invention has several means for generating essentially parallel light beams, which either have separate light sources (LEDs, LED matrixes) or a common light source. The light from the common light source is distributed by optical fibres, multi-core randomised head bundles or other light lines and led to the optical modules/units containing the microdisplay. The colour control of the common light source, such as a metal-halide lamp is carried out with a known method, e.g. by colour filters and shutters dividing the light into RGB channels, or by colour discs

BRIEF DESCRIPTION OF DRAWINGS

By way of example only, an embodiment of the invention will now be described with reference to the accompanying drawing, in which FIGS. 1 and 2 demonstrate the basic principle of the apparatus and method of 3D image display of the invention;

FIG. 4. the enlarged cross-section of the screen from FIGS. 1–3 with the scheme demonstrating light divergence;

FIG. 6. presents the image display principle of the apparatus according to the invention;

FIG. 30. a perspective and cross-sectional view of a possible embodiment of the screen from two angles;

FIG. 31. shows the cross-section of another embodiment of the screen;

FIG. 32. shows another embodiment of the screen from the same view as FIG. 31;

FIG. 33. illustrates another possible embodiment of the screen from the same view as

FIG. 30;

FIG. 43. the perspective view of the LED lighting unit used in the module shown in

FIG. 42;

FIG. 44. shows the organisation of the light spots of the lighting unit in FIG. 43; and finally FIG. 45. demonstrates the functional construction of the control system controlling the operation of the display apparatus of the invention.

BEST MODE FOR CARRYING OUT THE INVENTION

Figure 3:
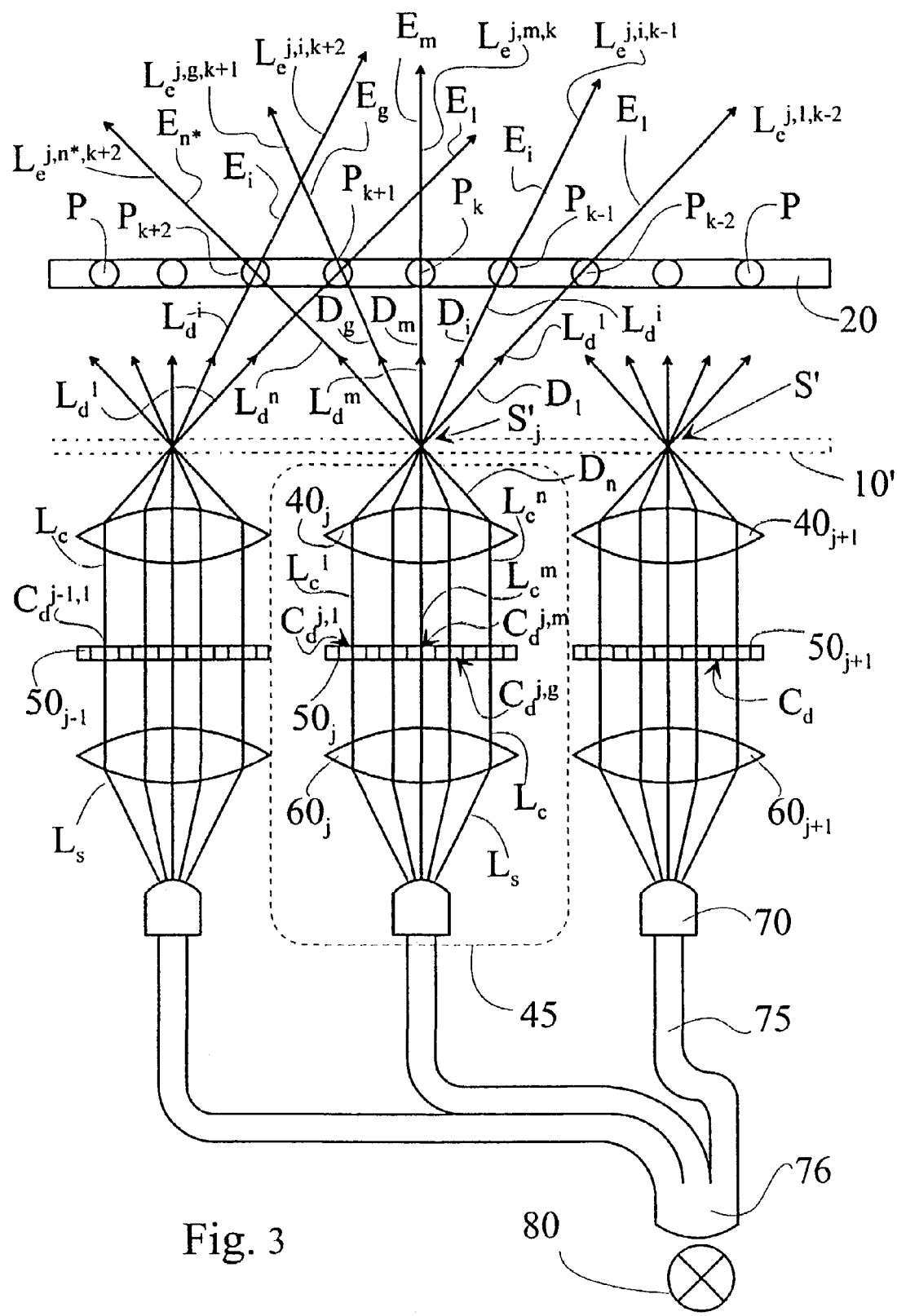
FIG. 3. is the scheme of the basic elements of the imaging system of the invention as well as a functional scheme demonstrating the basic principle of the optical lens system.

With reference to FIGS. 1–3 we explain the principle of the invention through presenting the apparatus. The apparatus is to provide three-dimensional images with a sense of space. This is fulfilled by the screen of the apparatus emitting different light beams in different emitting directions as explained in detail in FIG. 6. For that purpose the apparatus has a screen 20 that transmits and/or reflects light direction selectively. By the direction selectivity of the screen we mean that the exiting light beam $L_c$ exits the screen 20 depending of the incident angle of the deflected light beam $L_d$ arriving at the screen 20, i.e. a well defined emitting angle is associated to a given incident angle. In other words, the direction of the incident light beam $L_d$ explicitly determines the direction of the exiting light beam $L_e$, as opposed to diffuse screens, where after the incidence of a light beam other light beams exit in a relatively wide space angle and the direction of the incident exciting beam cannot be determined from a light beam exiting in a given direction.

There are screen points P in the screen 20, which are not necessarily physically distinguished, that is their position is determined by the incident and emergent light beams in a given case It is also viable, however that the position of the screen points P is also physically fixed in the screen, for example 20 with appropriate apertures. In such cases the screen points P can also be physically separated by a borderline 21 between the screen points P in FIG. 4. In most cases, like the described examples the direction selectivity of the screen 20 is realised so that the screen 20 transmits the light beams $L_d$ arriving at the screen points P without changing their directions or reflects the light beams $L_d$ like a mirror.

The screen points P of the screen 20 can emit colours of different intensity and/or colour in different directions. This feature of the screen 20 facilitates the apparatus to operate as a three-dimensional display. FIGS. 1–3 demonstrate an embodiment, where tight beams $L_d$ practically do not change their direction when passing through the screen 20 and exit as light beams $L_c$ within the emitting angle range $\alpha$. It is to be emphasised that the geometrical proportions of the arrangement in the figures do not correspond to the real size of the apparatus, the drawings are only to explain the working principle.

The following annotation convention is used in the following part of the description: We assume that there are q number of modules in the apparatus, where we mark an arbitrary module with an intermediate index j from one of the 1 . . . q modules. A module can emit light in n different directions, the annotations for the arbitrary intermediate directions are i, m or g. There are p number of screen points P in the screen 20, the intermediate index is k. Light can emerge from a screen point P in n* emitting directions, this way n* emitting directions can be associated to a P screen point, that is to the whole screen 20. The intermediate indexes used here are i*, m* or g*. In the case of light beams, the lower index (s, c, d, e) refers to the function of the light beam in the optical system, where $L_s$ represent light beams emitted by the light source, $L_c$ represent collimated light beams, $L_d$ represent deflected light beams, and $L_e$ represent the light beams finally emitted from the screen 20 towards the observer. The upper indexes refer to the module in line, the emitting direction related to the module and the concerned screen point P of the screen. Therefore, an light beam $L_e^{j,g,k+1}$ indicates that the light beam exits from the screen 20, emitted in direction g from module j, touching (in this case emerging from) the k+1-th screen point P.

In addition the apparatus has a screen 20 lighting system. This system contains modules for generating light beams $L_d$ and, The light beams $L_e$ are associated to multiple different points of the screen 20, and they are also associated to different emitting directions E of the screen points D. For example, in the embodiment in FIG. 3 essentially the device 45 constitutes a module and the light beams $L_d^1$–$L_d^n$ emitted by the j-th device $45_j$ pass through the different screen points $P_{k-2}, \ldots, P_{k+2}$ of the screen 20. It is also visible that as a continuation of every light beam $L_d^1$–$L_d^n$ light beams $L_c^{j,l,k-2}$, $L_c^{j,i,k-1}$, $L_c^{j,m,k}$, $L_c^{j,g,k+1}$, $L_c^{j,n,k+2}$ exit from the screen 20, propagating in different $E_1$–$E_{n*}$ emitting directions. At the same time, light reaches the same screen point from other modules, for example in FIG. 3, where light beam $L_d^1$ emerging from the j−1-th module $45_{j-1}$ also reaches screen point $P_{k+1}$ and emerges in a different direction E than light beam $L_d^g$ coming from the device $45_j$ of the j-th module. So, in other words, the individual modules are realised as means for generating light beams $L_c$ being emitted in different directions $E_1$–$E_{n*}$ from the screen points P, and for projecting light beams $L_d^1$–$L_d^n$ with different intensity and/or colour towards the individual screen points P from different directions. For better understanding, in FIG. 3 n=5, that is one module emits light in five different directions that reach five different screen points P. The individual modules of the apparatus are controlled by the appropriate controlling system according to the principles explained below.

The function of the modules, that is the 45 devices, which act as means for generating light beams, was performed in known solutions by light sources S positioned on a light emitting surface 10 at earlier versions (see FIGS. 1 and 2). The function of these light sources S is to emit light from the screen points P of the screen 20 in different emitting directions within the emitting angle range $\alpha$, with appropriate intensity and/or colour from the given screen point P towards the different emitting directions. The light sources S emit light in an angle range $\beta$. This angle range $\beta$ essentially corresponds to the emission angle range $\alpha$ of the screen 20. As seen in FIG. 1, light source $S_1, S_2, S_3, \ldots, S_n$ emits an light beam $L_d$ to screen point $P_3$ and the direction of the light beams $L_e$ emerging from screen point $P_3$ will be determined by the mutual position of the individual light sources $S_1$–$S_n$ and screen point $P_3$.

The essence of the present invention is actually a possible realisation of these light sources S, or more exactly the provision of an optical arrangement that can realise the functions provided by light sources S having an ideally zero width.

As in the case of the documents referred to, we demonstrate the operation of the invention by representing an arbitrarily selected horizontal line of screen points P and light sources S. It is understood that there are several lines of horizontal screen points when the real image is created and similarly the light beams emerging from the image generating means also emerge in several horizontal lines. The optical system then images the light beams to the appropriate horizontal lines of the screen.

The light beams $L_c$ creating the views associated to the different $E_1$–$E_{n*}$ emitting directions from the individual screen points P and associated to several different screen points P of the screen 20 of the inventive apparatus are generated in the following way:

There are two-dimensional displays, in this case a 50 microdisplay in the individual modules. This 50 microdisplay is typically an LCD panel. There is a lens in the modules imaging the pixels $C_d$ of the display 50 to the screen 20 simultaneously, that is the lens images the whole display 50 to the screen 20 simultaneously. In the two-dimensional display 50 the pixels $C_d$ are associated to the different screen points P and they are also associated to the different emitting directions $E^1-E^{n^*}$ of the screen 20. The pixels $C_d$ generate the light beams $L_c$ essentially simultaneously, with different co-ordinates, but substantially without any information concerning their emitting direction. The emitting direction associated to the light beams $L_c$ is only realised when the 40 imaging optics of the module 45 deflects the light beams $L_d$ into deflection directions $D^1-D^n$. The light beams $L_d$ propagating in the deflection directions $D^1-D^n$ pass the screen 20 substantially without changing their direction, so that the individual emitting directions E are actually determined by the deflection directions D of the light beams $L_d$ emerging from the module 45. It is visible that the light beams emerging from the j-th display 50j are substantially parallel, that is the light beams $L_c^1-L_c^n$ coming from the 50j display are not in the appropriate angle, i.e. they are not deflected towards the deflection direction D, which are themselves associated to emitting directions E. The deflection is first performed by the optics after the 50 display, because the 40 imaging optics associated to the individual displays 50 are designed for imaging substantially simultaneously the light beams $L_c$ generated by the pixels $C_d$ with different co-ordinates into different emitting directions $E^1-E^{n^*}$ or imaging directions.

To be more precise, the individual two-dimensional display 50 are regarded as image generating means, that generate complex images of details to be projected to the emitting directions E from the different screen points P. At the same time the imaging optics functions as an optical deflecting device diverting the light beams $L_c$ incident on the imaging optics, in a given angle depending on the co-ordinates of incidence. In the case of the shown embodiment the imaging optics consists of optical lenses 40. At the same time, the lighting system has means for generating substantially parallel and substantially unmodulated light beams $L_c$. This means for generating the parallel and unmodulated light beams is the collimator 60 in the case of the embodiment in FIG. 3. The apparatus has an optical system that projects the image generating means—the display 50—with substantially parallel light beams $L_c$ to an optical deflection means, in this case an optical lens 40. As explained below, the optical deflection means, that is the optical lens 40 in the optical system and the screen 20 are positioned relative to each other so that the light beams $L_c$ are deflected in the deflection directions D towards the appropriate screen points P by the optical deflection means, i.e. the optical lens 40. The individual deflection directions D are practically analogous to the different emitting directions E. The light beams $L_c$ are modulated by the information encoded in the details, that is pixels $C_d$ of the composite image produced by the image generating means, i.e. the 50 display.

In other words, the light beam generating means 45 projecting light beams $L_d$ to the screen points P has an image generating means that produces a composite image from the image details to be projected from the different screen points P to the different emitting directions E. This image generating means is the 50 microdisplay in FIG. 3, where a composite image is created in a way elaborated below.

Therefore, an essential element of the apparatus is the optical deflecting device diverting the incident light beams Lc in a given angle depending on the co-ordinates of incidence. This deflecting device is an optical lens 40 in this design, which in reality is carried out by a system of preferably plastic lenses with aspherical, or possibly diffractive surfaces, with an eye on the possibility of mass production. Another part of the apparatus is the means for generating substantially parallel and substantially unmodulated light beams $L_c$. This is, as mentioned above, in the case of the embodiment in FIG. 3 a collimator 60 that produces collimated light beams $L_c$ from divergent light beams $L_s$ emerging from a point light source 70. The expression "substantially parallel" means that the optical system has no focus between the collimator 60 and the optical lens 40, but a minute divergence or convergence of light beams $L_c$ is possible. By the expression "homogenous as a function of the spatial co-ordinates" it is meant that the light beams $L_c$ are substantially unmodulated in the function of their three-dimensional co-ordinates. In other words, their intensity and usually their colour is practically equal, according to the fact that the intensity and colour modulation of the light beams $L_c$ will be performed first by the 50 display, when the light beams $L_c$ pass through it.

As it is shown in FIG. 3, the light of the light source 70s is provided by the common light source 80, which is distributed to the 70 individual light sources by the 75 optical fibre wires selected from the bundle 76 of optical fibre wires. Naturally, it is also possible that the 70 individual light sources have their own light. valid lamps may be applied as a common light source 80, such as those from the OSRAM HTI series.

The apparatus according to the invention comprises an optical system which projects the image produced by the individual display devices (i.e. the 50 display) to the optical deflecting means (i.e. the optical lens 40) with substantially parallel light beams $L_c$. In the optical system, the optical deflecting means, i.e. the optical lens 40, and the screen 20 are positioned relative to each other so that the light beams $L_d$ are deflected from different deflection directions D to the appropriate screen points P of the 20 display, where, as shown above, the light beams $L_d$ modulated first with the information coded in the individual image details of the complex image, by the 50 display as an image generating means, and secondly, the light beams $L_d$ are deflected by the optical lens 40, as an optical deflecting means. Thus, the light beams $L_d$ are modulated by the information coded with the individual pixels (i.e. by the information carried by the pixels) of the image generated by the displays 50, as a image generating means. The optical deflecting means, i.e. the optical lens 40, deflects the light beams $L_d$ in the different deflection directions D to the screen points P corresponding to the mutual position of the appropriate modules 45 and the screen 20. The modules 45 are positioned periodically shifted and to optically equal or optically symmetrical positions in relation to each other and the screen. The term 'optically equal' means that the 45 individual modules include identical optical systems and they are shifted or sometimes rotated in relation to the screen with regular periodicity.

It is perceivable that the optical deflection means, the optical lens 40, acts as a deflecting means which deflects the incident light beams $L_c$ with a given angle, depending on the co-ordinates of the incidence. As illustrated in FIG. 3, the light beam $L_c^1$ passing through the pixel $C_d^{j,l}$ at the left edge of the 50j SLM will be deflected to a deflection direction $D_l$ which is different from the deflection direction $D_m$ of the light beam $L_c^m$ passing through the pixel $C_d^{j,m}$ in the middle part of the 50j SLM, which passes through the screen 20 in the Em emitting direction, in accordance with the fact that the $E_m$ emitting direction is determined by the $D_m$ deflection direction. It is also clear from FIG. 3 (see also FIGS. 1 and 2), that, because of the different deflection directions, the light beams $L_d$ deflected to different deflection directions $D_1$–$D_n$ by the common $40_j$ optical lens pass through different screen points P. In this instance this means that the light beam $L_d^m$ propagating in the direction $D_m$ passes through the screen point $P_k$ and the light beam $L_d^1$ advancing in the direction $D_l$ passes through the screen point $P_{k-2}$. From the above it is also clear that the individual displays 50 generate a composite image which is not identical with any real image that the apparatus projects to any direction, because light beams passing through adjacent screen points of the display 50 do not necessarily arrive at two adjacent screen points P on screen 20 as well. Even if this is the case, owing to the imaging system, such adjacent light beams will practically leave the screen 20 in two different directions E, so they must be coded on the display 50 with information corresponding to different emitting directions E. Actually, viewing the screen 20 from a region, namely from one of the directions opposite the emitting direction E, those light beams $L_e$ which reach the observer's eye, and which are associated to different screen points P on the screen 20, usually pass through and are modulated by different displays 50. Considering that within the emitting angle range $\alpha$, determined by the emitting directions E, light is emitted in practically all directions. Therefore, when viewing the screen 20 from this region, light beams reach the observer's eye from all screen points P (also see FIG. 5.). Thus the emitting angle range $\alpha$ is practically identical with the complete viewing angle region, i.e. with the angle region within which the light beams from screen points P reach the eyes of the observer looking at the screen 20, or more simply, this is the region from where the observer is able to perceive some sort of image on the screen 20.

The principles of imaging are explained in more detail in the following:

In the emitting angle range $\alpha$ the individual light beams $L_e$, propagate in well determined emitting directions E. Viewing the screen 20 from a direction opposite these emitting directions E, light beams leaving the individual screen points P may be seen, and therefore a complete image is perceived on the whole of the screen 20, this complete image being composed of the screen points P. It must be noted that in the image appearing for the observer the surface of the screen and the screen points P themselves may not necessarily be perceived, and the image perceived will not be seen by the observer as a two dimensional projection of view, but the observer is more likely to feel real space.

For example it is presented in FIG. 3., that the light beams $$L_e^{j-1,i,k+2}, L_e^{j,i,k-1}$$

from the $P_{k+2}$, $P_{k-1}$ screen points exit in the emitting direction $E_i$. Although it is not shown, a light beam $L_c$ leaves each screen points P in all directions E, so there are light beams exiting from the screen points $P_{k+1}$, $P_k$, $P_{k-2}$ in the direction $E_i$ as well.

Accordingly, viewing the screen 20 from a direction opposite the emitting direction $E_i$, the observer will see light of specific colour and intensity arriving from the screen points $P_{k+2}$, $P_{k+1}$, $P_k$, $P_{k-1}$, $P_{k-2}$, and so the observer will perceive the image created by the screen points $P_{k+2}$, ..., $P_{k-2}$. In the same way, it may also be observed in FIG. 3. that the light beams $$L_e^{j-1,1,k+1}, L_e^{j,1,k-2}$$

exit in the emitting direction $E_l$ from the screen points $P_{k+1}$, $P_{k-2}$. Similarly, light beams leave the other screen points $P_{k+2}$, $P_k$, $P_{k-1}$ in the emitting direction $E_l$ as well; for better overview of the figure, these are not shown. Thus, viewing the screen 20 from a direction opposite the emitting direction $E_l$, the observer will see light of specific colour and intensity in the screen points $P_{k+2}$, $P_{k+1}$, $P_k$, $P_{k-1}$, $P_{k-2}$, i.e. the observer will perceive the image generated by the screen points $P_{k+2}$, ..., $P_{k-2}$. However, it is easily seen from the following that the image perceivable from a direction opposite the direction $E_l$ emitting direction will usually be different from the image perceivable from a direction opposite the $E_i$ emitting direction. This means that the screen 20 is able to provide different perceivable pictures from different directions. It may be seen that the light beam $$L_e^{j-1,g,k+2}$$

leaving screen point $P_{k+1}$ is modulated by the pixel $C_d^g$ of the $50_j$ display, while the light beam $$L_e^{j-1,1,k+1},$$

also leaving screen point $P_{k+1}$, is modulated by the first pixel $$C_d^{j-1,1}$$

of the $50_{j-1}$ display. Accordingly, the screen 20 is able to produce different pictures from different directions, which means that it can display three-dimensional pictures.

Figure 5:
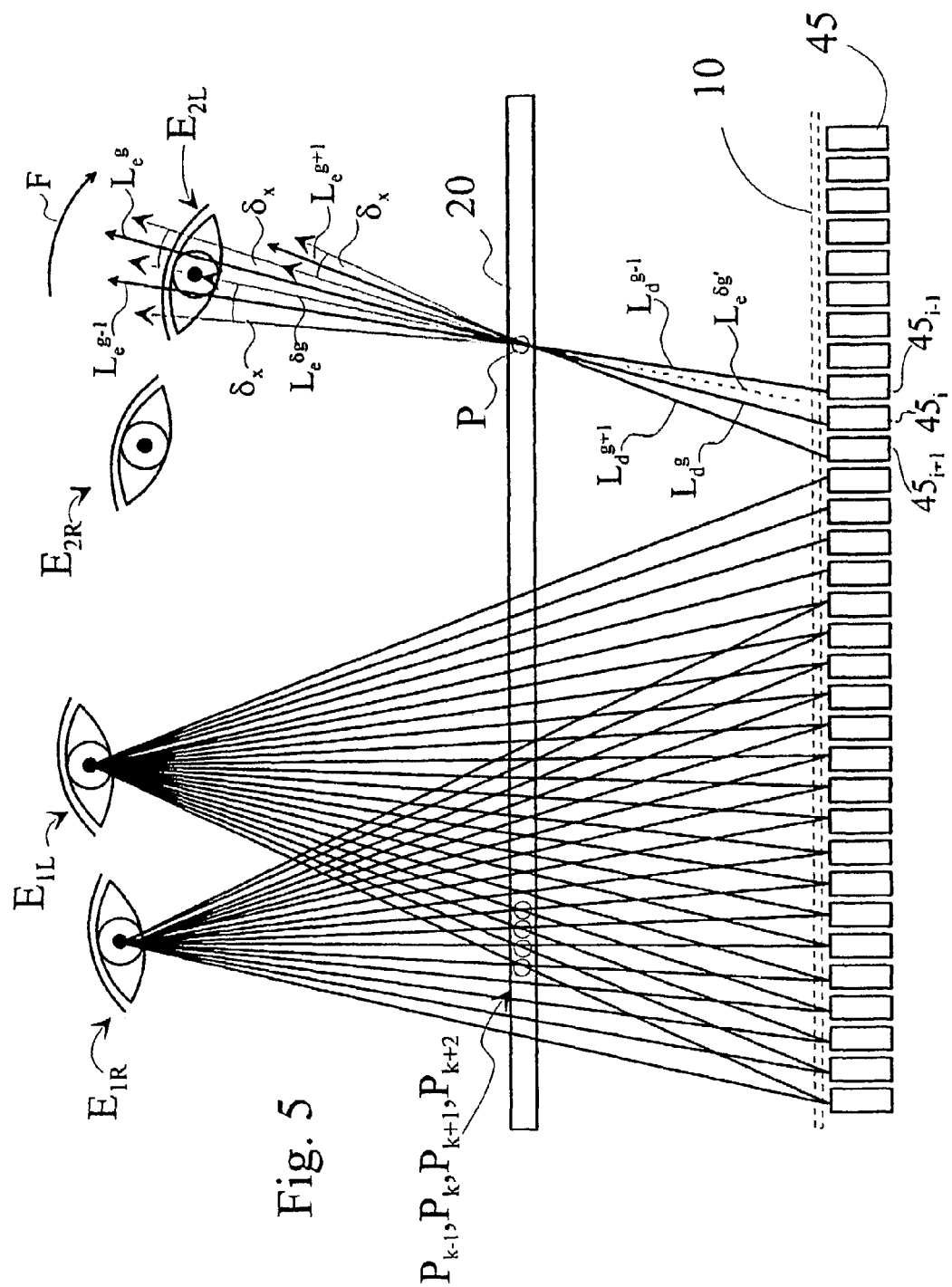
FIG. 5. shows the way light beams produced by the apparatus with the modules in FIG. 3, in the case of observers watching the apparatus from a given position.

It is well shown in FIG. 5. that the great number of modules 45 behind the screen 20 and the given divergence of the screen 20 make sure that a light beam arrives to the eyes of the observer from all screen points P, which results in the observer perceiving a continuous image within the angular region. As it is shown separately on the right hand side of the FIG. 5., the light beams $$L_e^{g-1}, L_e^{g-1}, L_e^{g+1}$$

which reach the screen 20 as collimated non-divergent beams—leave the screen point P in different directions. These beams are dispersed by the screen 20 with the angle $\delta_x$, making them slightly divergent. This way light reaches the eyes $E_{2L}$ of the observer even though the direction of the light beams $$L_e^{g-1}, L_e^g$$

had originally missed the observer' eyes. It may be seen that the light beam $L_e^{\delta g}$ reaching the observer's eyes $E_{2L}$ seems to be the continuation of the virtual light beam $$L_e^{\delta g'},$$

which itself seem to start from between two modules 45 and pass through the P screen point. This way there is no "gap" between the light beams $$L_e^{g-1}, L_e^g, L_e^{g+1},$$

the visually perceived image is not flawed with unlit parts, and the viewing region is continuously covered.

It also seen that the complete view associated to the individual viewing directions is not produced by one module, but by several modules. With other systems, the creation of the complete view belonging to one certain view by one optical unit leads to abrupt, disturbing changes, which may be observable in cases of unavoidable changes in the image when the viewing point is changed. On the contrary, in the arrangement described in the invention, the image seen from any point represented by the eyes $E_{1L}$, $E_{1R}$ of the observer is created by several modules. For example, with an arrangement providing horizontal parallax in practice, each image associated to a viewing directions is created by a large number of 25 vertical strips, the strips being associated to the individual modules (see also FIG. 7*b*.). The 25 stripes abut each other. This image arrangement ensures that if the observer changes position, and his viewing point changes, for example, by moving in the direction of the F arrow, the light beams $$L_e^{g-1}, L_e^{gl}, L_e^{g+1}$$

and the light beams $$L_d^{g-1}, L_d^g, L_d^{g+1}$$

of the modules are changed continuously, creating the image perceived by the $E_{2L}$ eye, the position of which is continuously changing. In this manner, a continuously changing image is created, in accordance with the fact that the $$L_d^{g-1}, L_d^g, L_d^{g+1}$$

light beams are created by different modules 45. It is also clearly shown that beams from different modules 45 reach the right eye $E_R$ and the left eye $E_L$ of the observer from the individual screen points $P_{k-1}$, $P_k$, $P_{k+1}$, $P_{k+2}$ etc. This basically means that the same screen point is able to transmit different information for the left and right eye.

The same effect is represented in an even more detailed fashion in FIG. 6. In this figure we present how the apparatus described in the invention displays different dimensional figures. As an example, in FIG. 6, the apparatus displays two dark point objects $O_1$ and $O_2$ and two light point objects $O_3$ and $O_4$, which are perceived as three dimensional for two observers. For better understanding we primarily indicated those light beams of the modules 45 which actually reached the eyes of the observers, but it must be emphasised that there are light beams leaving all modules in all emitting directions. Therefore the apparatus is independent of the position of the observers and provides a real 3D image when viewed from any direction within the view range. As opposed to the simply stereoscopic systems (handling the left and the right eye) or the multiview systems (changing images abruptly), the apparatus offers a perfect movement parallax, the continuous image may be "walked around" by several observers within the view range, and the observers may look behind the objects, where hidden details may also appear.

In FIG. 6, for example, it is shown that, the first observer will perceive the dark object $O_1$ with both eyes $E_{1R}$ and $E_{1L}$, but to achieve this the module $45_{i-8}$ transmits a light beam to the right eye $E_{1R}$, while the light beam to left eye $E_{1L}$ is transmitted by the module $45_i$. This way the observer will clearly perceive that the light from the object reaches his two eyes from different angles, and he/she will also perceive the distance from the object $O_1$. Not only does the first observer perceive the object $O_2$ as well, but he/she can also sense that for him/her the object $O_2$ is behind the object $O_1$, because the observer only receives information about the object $O_2$ through his/her $E_{1L}$ left eye, through the light transmitted by the module $45_{i-2}$ in the direction of the left eye $E_{1L}$. At the same time, for the second observer the objects $O_1$ and $O_2$ will appear as two distinct objects, according to the light beams reaching his/her eyes $E_{2R}$ and $E_{2L}$ from the modules $45_{i+17}$ and $45_{i16}$, and the module $45_{i+8}$. The left eye $E_{2L}$ of the second observer cannot see the object $O_1$, because the light beams arriving from its direction cannot be produced by any of the modules. On the other hand, on the basis of the same principles, both observers will see the point objects $O_3$ and $O_4$. For example, the light object $O_4$ will be perceived by both eyes of the first observer on the basis of the light exiting the modules $45_{i+3}$ and $45_i$, and the modules $45_{i-8}$ and $45_{i-11}$. It is noted that owing to light beams, which may be emitted in different directions and with different intensity, the same module $45_i$, for example, is able to display a different colour object for the firs observer's right eye $E_{1R}$ and left eye $E_{1L}$. The right eye $E_{2R}$ of the second observer does not perceive the object $O_4$, because it is obstructed by the object $O_2$. The second observer can only see the object $O_4$ with his/her left eye $E_{2L}$. It is perceivable that the apparatus is capable of displaying any number of point objects of this sort, and this way it is also suitable for displaying objects of finite dimensions, since these objects may all be displayed as sets of points. We can also see that objects in front of and behind the screen 20 can equally be displayed with the help of the apparatus. The light beams produced by the apparatus are exactly the same as if they had started from the object to be displayed, and the apparatus does not take into consideration the position of the observer, and a real image is displayed in all directions within the emitting angle range, regardless of the position of the observer. It is emphasised here again that the apparatus continuously emits light beams in directions where there are no viewers at all. Such light beams are represented in FIG. 6 as light beams $L_e$.

From the above, it is clear that in accordance with the inventive method three dimensional images are displayed by generating light beams $L_d$ (or more precisely, light beams $L_e$ as the continuation of these light beams $L_d$), the light beams $L_d$ creating different views associated to different emitting directions E of the individual screen points P. The light beams $L_d$ are projected onto a direction selectively transmitting and/or reflecting screen 20. During the method, substantially simultaneously light beams $L_c$ are generated with the pixels $C_d$ of a two-dimensional display 50. These light beams $L_c$ have substantially no information about their emitting direction E. The pixels $C_d$ have different co-ordinates. The light beams L are associated to the different points P on the screen 20 and correspond to the different emitting directions E of the screen points P. The light beams $L_c$ generated by the pixels $C_d$ with different co-ordinates are imaged substantially simultaneously into different deflecting directions D. The imaging is performed as a function of the co-ordinates of the pixels $C_d$ generating the light beams $L_c$.

Figure 39:
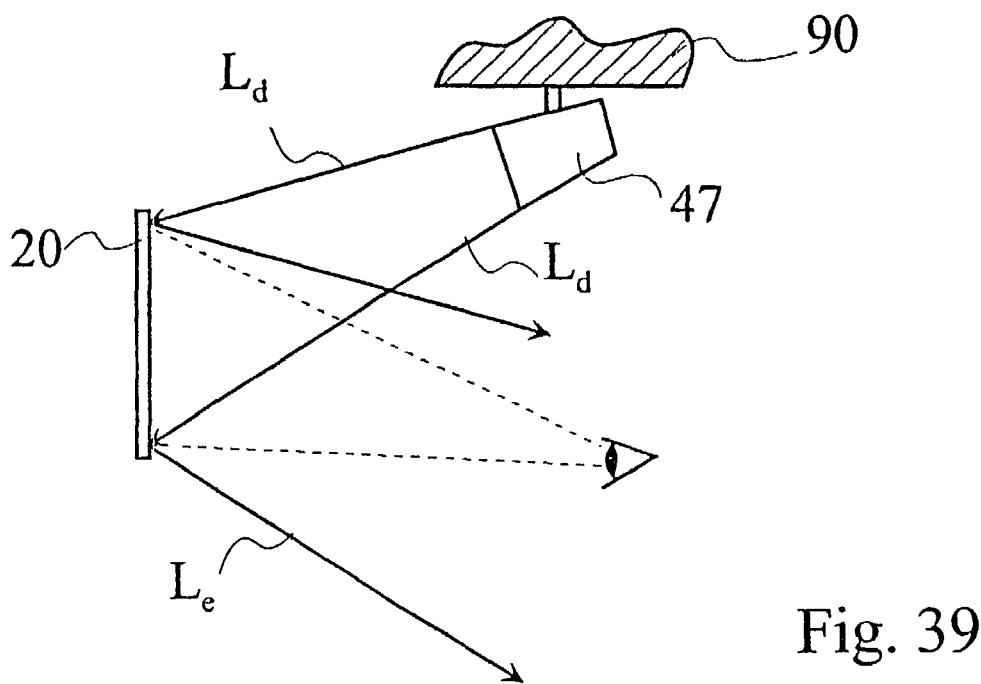
FIG. 39. illustrates a way of application for the apparatus in FIG. 38.

The light beams $L_c$ emitted in different emission directions E from the screen points P are normally created by sending light beams $L_d$ with different colour and/or intensity from different directions to the individual screen points P of the screen 20, and letting the $L_d$ light beams through the screen 20 without actually changing their direction. It is perceivable that the procedure described in the invention may also be fulfilled, by the mirror-like reflection of the light beams $L_d$ from the screen 20 as shown, for example, in FIG. 39. By the term "mirror-like" it is meant that the light beam $L_d$ falling on the screen 20 at a certain angle will be reflected at a substantially identical angle, the same way as light beams are generally reflected by a normal plane mirror or a retroreflector. Additionally, it is emphasised that by the term "mirror-like" also covers the case when the reflection is retroflective along at least one dimension. This means that not considering the component of the direction vector of the input light beam, which is orthogonal to the screen surface, at least one further component will not change sign when comparing the direction vectors characterising the direction of the input and exit light beams. With a normal mirror, the incident and exit planes orthogonal to the screen surface are the same, and both components of the vector characterising the input direction which are parallel with the surface of the screen remain unchanged. With a retroreflector, both components of the vector characterising the input direction which are parallel with the surface of the screen change sign. If the screen is only retroreflective in one direction, only one of the components being parallel with the screen will change sign.

Thus the light beams $L_d$ with different directions which are to be emitted to the screen points P are produced by creating a composite image from the image details projected towards the different emitting directions E from the different screen points P with the help of the image generating means, i.e. the 50 display. This composite image is realised by the providing the driver circuits 100 of the display 50 with appropriate input data. (see FIGS. 8. and 10.). A suitable program creates the input data, i.e. distributes the image details to the drivers of the individual displays 50, as shown in FIG. 4. The image details constitute the images which are associated to a particular viewing direction of the three dimensional image. The image created on the 50 display is illuminated by substantially parallel light beams $L_c$. In this manner, substantially parallel light beams $L_c$ are generated, which are modulated with the information coded in the individual image details. These substantially parallel light beams $L_c$, which are now modulated with the appropriate image information, are projected onto the optical deflection means, which is the imaging optical lens 40 in our case. The substantially parallel light beams $L_c$, which are now modulated with the image IS details of the composite image, are projected with the optical deflecting means (i.e. the optical lens 40) towards the appropriate screen points P. This projection is performed by deflecting the light beams $L_c$ into different deflection directions D. The deflection directions D are determined according to the position of the relevant image details on the composite image, and the imaging properties of the optical deflecting means. The appropriate screen points are thus defined by the mutual position of the relevant modules 45 and the screen 20. The modules 45 comprise the relevant optical deflecting means, namely the optical lens 40.

Preferably, the display element, i.e. the 50 display, is a microdisplay, ideally a ferroelectric liquid crystal display (FLC microdisplay), especially an ICFLC (integrated circuit ferroelectric liquid crystal). Other traditional liquid crystal displays may also be used, such as, the SONY LCX series, or transmission or reflection panels, such as the MicroDisplay Corp. MD640G1 or the Displaytech, Inc. LightCaster® SXGA Display Panel. A further possibility is the application of light valve matrices based on other technologies.

It is must be mentioned that it is theoretically possible with a to generate with the image generating means so many image details, which correspond to a number of directions which equals the number of emitting directions of the individual screen points P. In this case as many image generating means, i.e. displays 50 are necessary, as the number of screen points P in each line of the screen 20, because the total number of light beams emitted from one line of the screen 20 must be equal to the product of the number of screen points and emission directions. This solution, which is illustrated in FIG. 1, can only be carried out in practice with difficulty, because in most cases the screen points P must be formed relatively close to each other, and accordingly, the displays 50 would also have to be positioned in a way that the distance between them is the same as the distance between the screen points P.

However, it may be feasible with certain displays applications with a large surface, such as billboards, scoreboards, etc., which are usually viewed from a greater distance, thus the distance between the screen points may be significant as well, even several centimetres.

The practical solution generally applied with smaller devices is that one image generating means produces a number of image details which correspond to a number of directions which equals the multiple of the number of emitting directions E associated to the individual screen points P. In this manner, fewer image generating means are applied than the number of screen points P (see FIG. 2). This way we use the image generating means to generate image details corresponding to the desired number of emitting directions E for several screen points P. Such an arrangement is actually shown in FIG. 3, It may be observed that the screen points P are positioned more closely than the associated optical lens 40 and the displays 50. In other words, one display 50 has to "serve" several screen points P, usually on the basis of identical or similar directions, in order for a sufficient number of light beams $L_e$ to leave each screen point P in an appropriate number of emitting directions E. When comparing FIGS. 1 and 2, it may be seen that, if the light emitting surface 10 is positioned further from the screen 20, i.e. the distance between them is increased, the distance $X_s$ between the light sources S may be larger than the distance $X_p$ between the screen points P. Owing to this solution, the size of the display 50 may be larger than the distance $X_p$ between the screen points P. This solution is also described in detail in the document No. WO98/34411.

Figure 11:
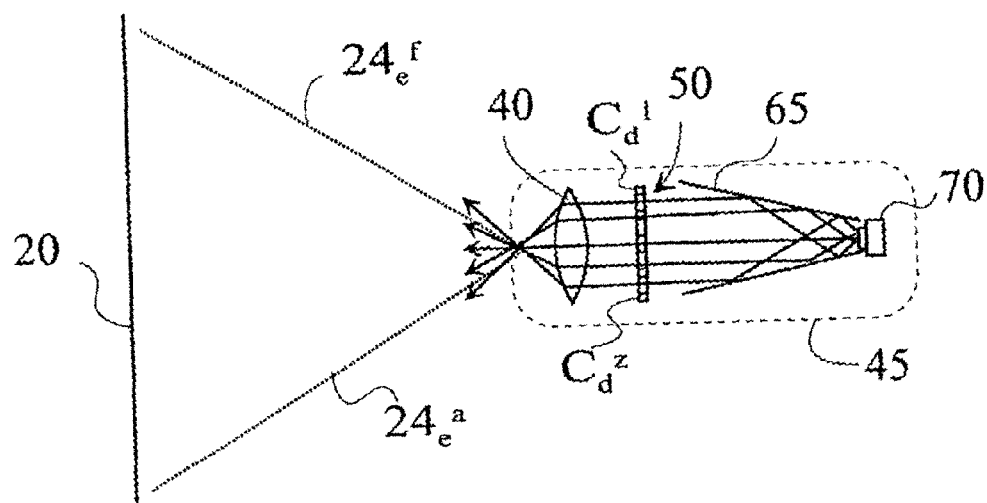
FIG. 11. shows the optical system of the arrangement of FIG. 10 from a similar view as FIG. 9.
Figure 12:
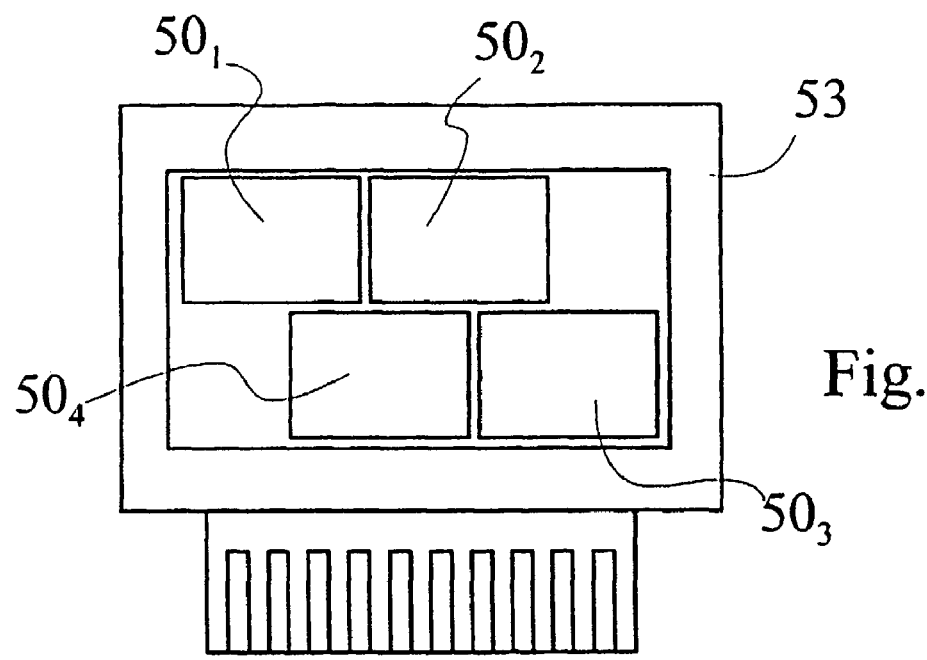
FIG. 12. a theoretical scheme of a modified version of the imaging system that illustrates several image generating means with one display.
Figure 13:
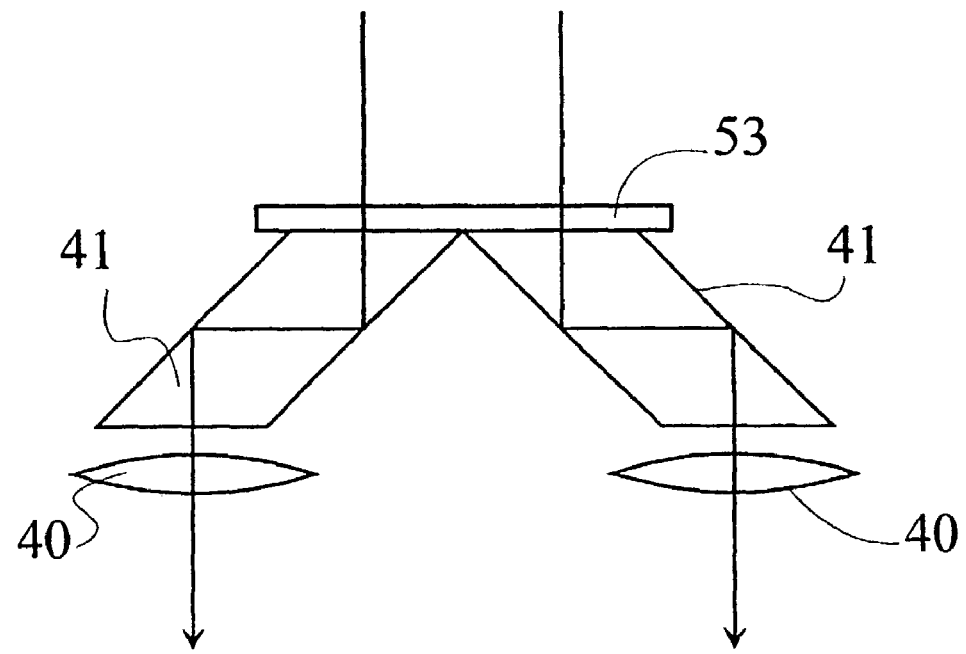
FIG. 13. illustrates the optical system of the image generating means created according to FIG. 12.
Figure 14:
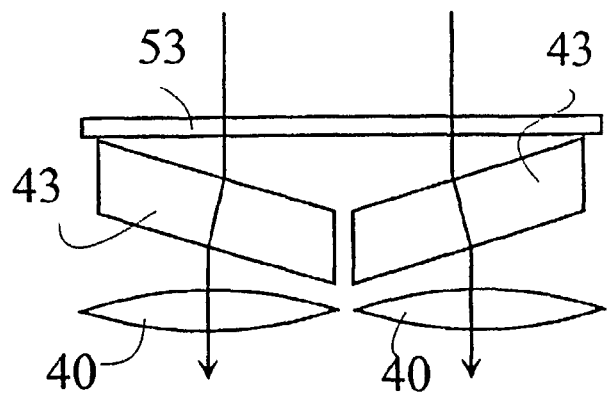
FIG. 14. a version of the optical system of FIG. 13.
Figure 15:
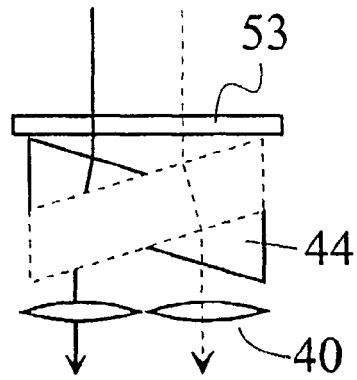
FIG. 15. another version of the optical system of FIG. 13.

Apparently, if there is a p number of screen points P and there is a q number of modules 45, and light beams $L_d$ are leaving each module in n deflection directions D, than a number n* of light beams $L_e$ can leave one screen point P, where n*=qn/p, since pn*=qn. As a result of this, if we want to increase the number n* of emitting directions, i.e. the angular resolution, when there is no change in the viewing angle, we must increase the number of modules (if the width of the device is given, we must position the devices more closely) or reduce the number of screen-screen points or increase the direction resolution of the modules. The increase of the number of modules may be limited by their size, and the reduction of the number of screen points would decrease the resolution of the image perceived. Thus displays with the biggest possible pixel number must be applied in the modules 45. With moving pictures the formula is different, because the number of light beams leaving each screen point must be provided within a set unit time. In this case, the following formula applies: n*f*=(qn/p) f, where f* is the frame-frequency, which is usually 30 1/s, while f is the frame frequency of the display. Since the latter can be reasonably high, q may be reduced this way, which means that a smaller number of fast displays is required. A solution of this type is shown in FIG. 11.

It is clearly shown in FIG. 3 that the light beams $L_d$ deflected by the optical lens 40 normally pass through a common focal point. These focal points may actually be regarded as if they were forming a virtual light emitting surface 10' with virtual light sources S', which produce the light beams $L_d$ with different direction and intensity.

Figure 7A:
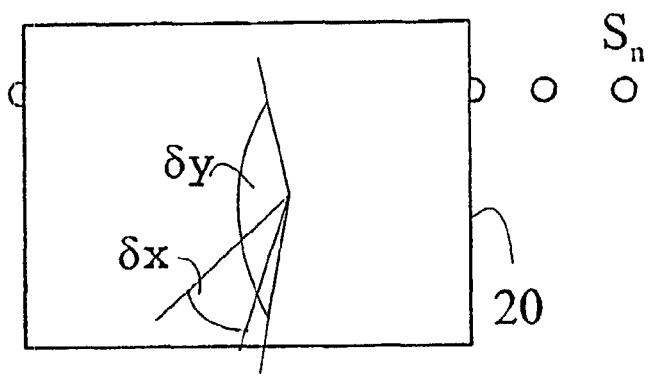
FIG. 7a. is a partial front and top view perspective of the screen in FIG. 4.
Figure 7B:
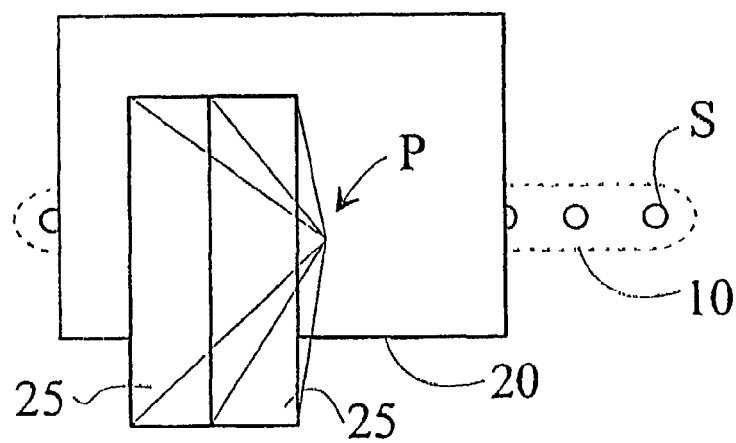
FIGS. 7b. and 7c. demonstrating the difference between two different realisations of the 3D image display system according to the invention, in views similar to FIG. 7a, FIG. 8. illustrates the three-dimensional arrangement of the parts for one embodiment of the apparatus of the invention.
Figure 7C:
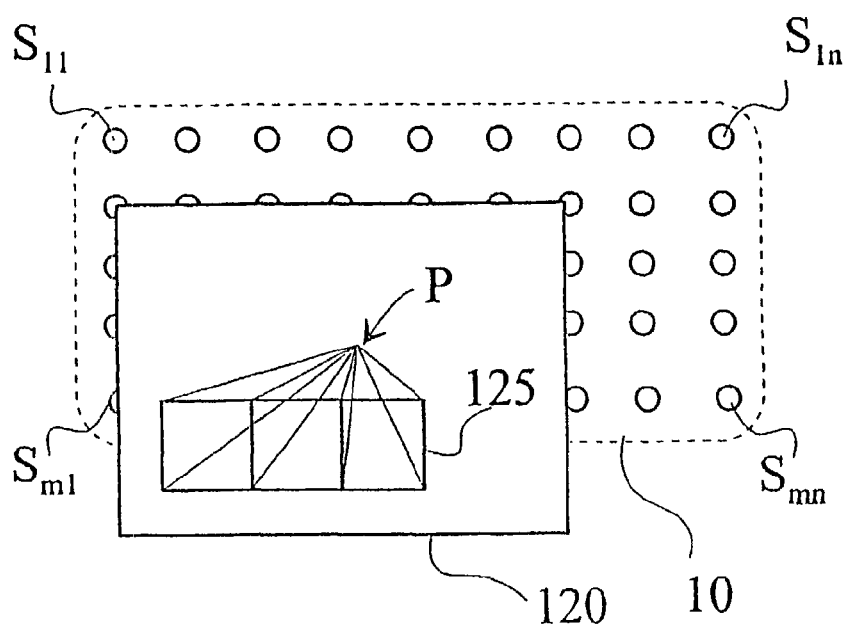

The screen 20 shown in FIG. 4, as described in the document no. WO98/34411, provides the exiting light beams Le with a certain divergence, for example by applying a holographic diffusing screen as the screen 20. The screen 20 provides the substantially collimated output beams leaving the screen points P with a divergence δx, with a maximum of few degrees, so that there is an overlap between the light beams $$L_d^i, L_d^{i+1}$$

arriving from the modules 45, which are practically the same as the light beams $$L_e^i, L_e^{i+1}$$

belonging to adjacent emitting directions. Apparently, the overlap, i.e. the tight contact of the adjacent light beams $$L_e^i, L_e^{i+1}$$

appropriate, when the divergence angle δx is the same as the angle γ between the emitted light beams. This is shown in FIGS. 7.*a–c*. FIGS. 7*a–c* also illustrate that with arrangements without vertical parallax, when there is a horizontal divergence δx, a relatively big vertical divergence δy is needed, otherwise the image would only be perceivable from a narrow horizontal strip.

It is shown in FIG. 7*a*. that the screen 20 is an optical plate which produces a divergence at divergence angles δx, δy on the direction selectively transmitted and/or reflected light beams. Theoretically it is possible to form the screen 20 in a way that the necessary divergence is generated on more surfaces, for example on its input and/or exit surfaces, or the divergence may be provided by an additional diffusing screen positioned on the screen 20. The application of further plates providing mechanical protection or optical correction may be beneficial, such as the use of filters to improve contrast, and antireflection coating.

In theory the light emitting surface 10 may extend not only horizontally, but vertically as well, which means that it may be divided into S light emitting points vertically, too. In this case the modules 45 are not only placed in a horizontal position creating a view associated to a vertical parallax (as in FIG. 7*b*.), but the horizontal lines of modules placed in different vertical positions create views belonging to vertical parallaxes. In this case the individual light beams $L_e$ do not illuminate a 25 strip, but a 125 square (see FIG. 7*c*): This way a changing view from the screen 20 will be perceived not only by a horizontally moving observer, but also when the observer is moving up and down. This, however, is very difficult to accomplish technically. Therefore, in practice it is more simple if we discard the real vertical three dimensional effect, and, similarly to the arrangement shown in FIG. 5., and the beams leaving the screen 20 are formed so that the emitted light beams leave in a vertically wide, but horizontally narrow 25 strip (see also FIG. 7*b*). This solution is also described in detail in the document no. WO 94/23541.

Figure 8:
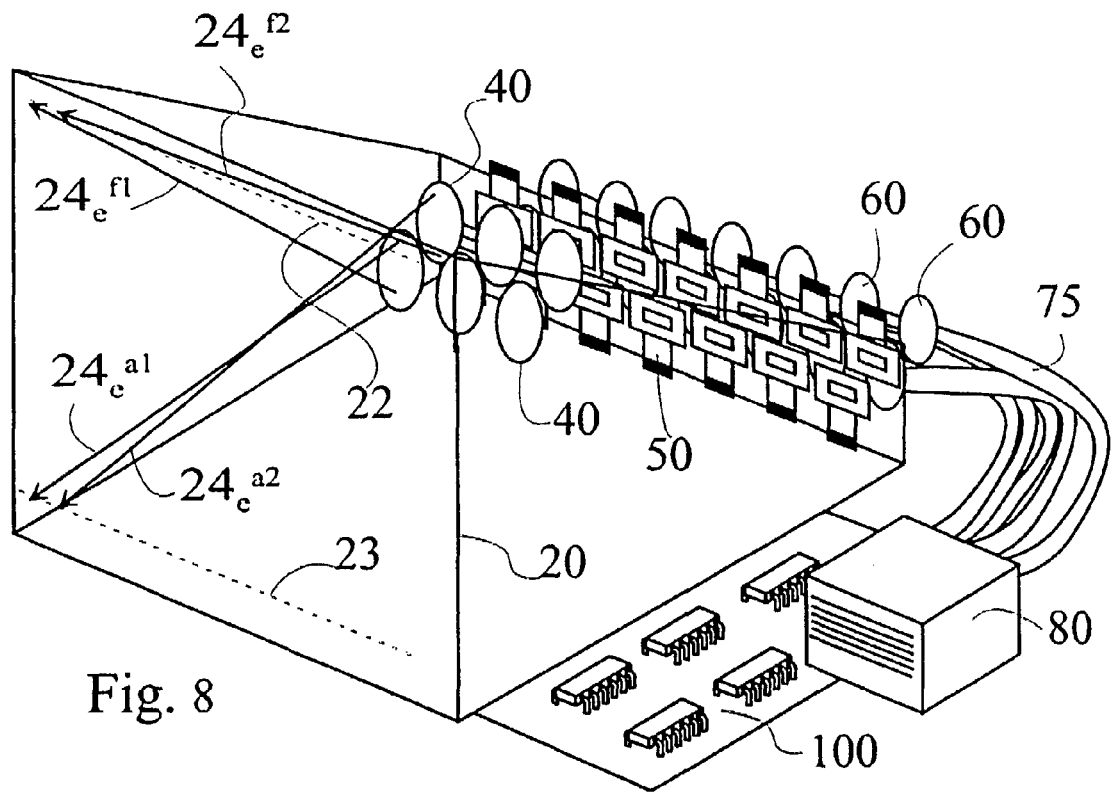

FIG. 8. shows a practical embodiment of the 3D display apparatus realising the horizontal parallax (represented conceptually in FIG. 7.*a*), and the spatial arrangement of its parts. For reasons to be explained later, the modules comprising the optical lens 40, the display 50 and the collimator 60 are positioned in two horizontal lines. The two lines are shifted by a half period relative to each other. The optical systems containing the imaging optical lens 40, however, are formed so that the modules of the lower and upper line image the $24_c$ light beams from the 45 modules, which principally correspond to the $L_c$ light beams, to the same horizontal 22, 23 screen lines. In the figure only the bottom screen lines 23 and the top screen lines 22 are presented, but naturally the screen 20 contains an appropriate number (e.g. 480) of horizontal lines. For instance, it is shown in FIG. 8 that the light beams $24_c^{f1}$ and $24_c^{a1}$ from the first module of the lower line fall on the same screen line 22, 23 as the light beams $24_c^{f2}$ and $24_c^{a2}$ from the first module of the second line (the second module of the complete module series). The small-scale vertical difference in angles between the two light beams $24_c$ from the two modules, which arise from the distance between the two lines of modules, does not cause any disturbance in the perception of the picture, because, as it was shown in FIGS. 7 and 7.*b*, the beams $24_c$ are already diffused at a great (approx. 100 degree) angle vertically. Therefore, the vertical deviation of the beams due to the difference between the lines of modules is practically negligible.

Figure 9:
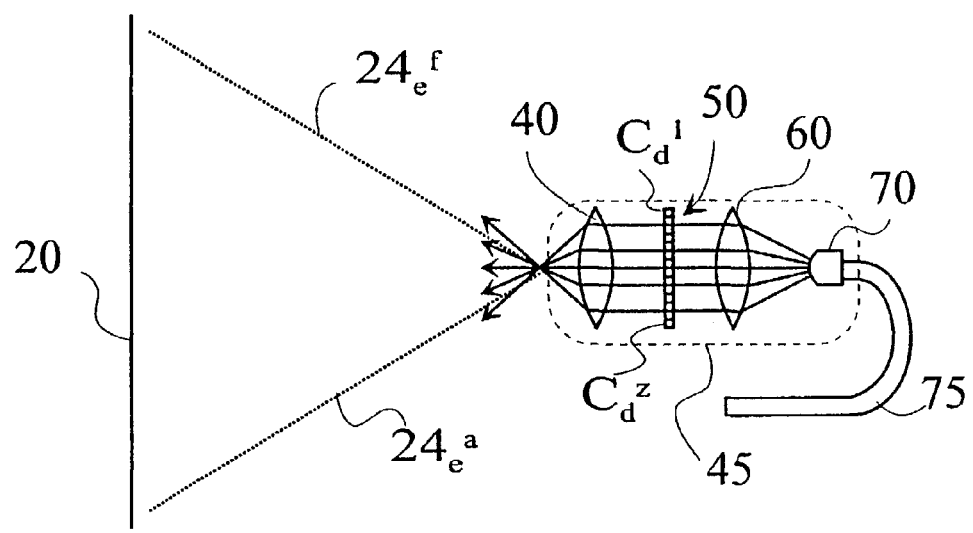
FIG. 9. is a side view of the imaging system of FIG. 3.

In FIG. 9 the optical system of a module can be seen in vertical cross-section. Although the imaging may appear similar to the horizontal cross-section shown in FIG. 3, the significant difference is that the pixels $Cd_1$–$Cd_z$ belonging to one column of the display 50 belong to the same image, i.e. the view perceivable from one particular direction. In other words, the vertical screen strip, which appears on the display 50, will also appear in reality on the screen 20 as a simultaneously visible screen strip, which is associated to a view seen from a certain direction.

If an image must be displayed, which provides a spatial (3D) view vertically as well, as many module lines are needed as the number of the required emitting directions. In this case the arrangement of the pixel columns on the display 50 is carried out on the basis of the same principles as the arrangement of the lines of the pixels $C_d$, i.e. the individual pixels of a pixel column belong to different vertical emitting directions. Also,—beside their horizontal divergence—, the vertical divergence of the light beams exiting from the screen 20 after the vertical diffusion by the screen 20 is significantly smaller (see FIG. 7*c*), corresponding to the angle between the vertically adjacent modules. This divergence is so small that there is no gap between the light beams leaving in vertically adjacent directions, and the eyes of an observer in any position will perceive a light beam.

Figure 10:
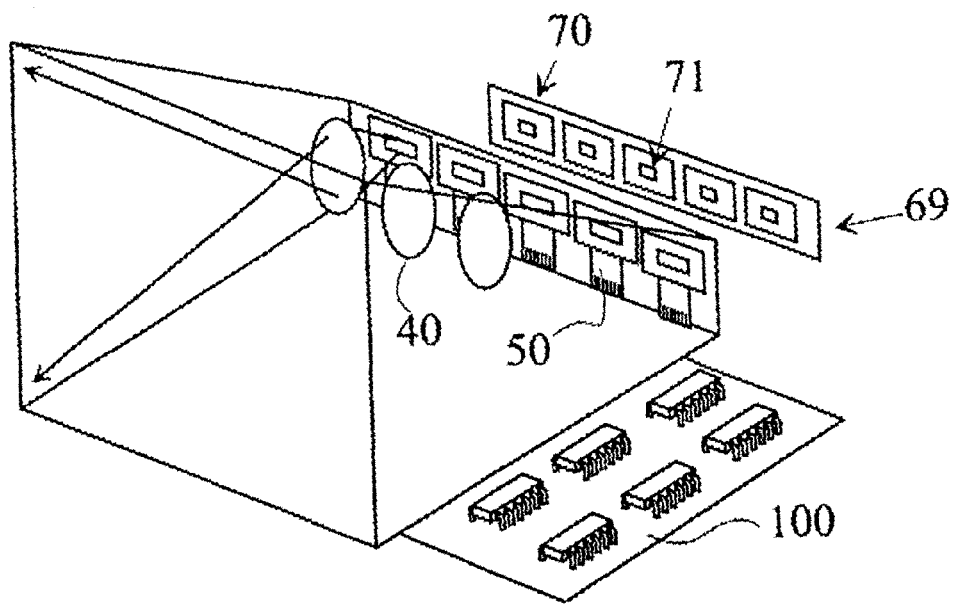
FIG. 10. similar to FIG. 8, another embodiment of the apparatus of the invention.

In FIG. 10 a version of the device in FIG. 8 is shown which only includes one line of modules 45, but otherwise the working principle is the same. Usually, displays with a smaller horizontal dimension must be used for modules 45, which are arranged in one line. In order to obtain the desired angle resolution, line of the modules (which is, in fact, constitutes the virtual light emitting surface 10') must be placed further away from the screen 20, which requires displays 50 with large resolution, and also imaging lenses in corresponding sizes and high resolution. At the same time, this arrangement is simpler optically and from a control point of view.

FIG. 10. shows the apparatus with a version of a further possible illuminating system, which applies separate light sources 70, preferably LED-s 71 illuminating in RGB colours, and an optical adapter for the homogenising or collimating the light beams, preferably a micro lens matrix or an internal reflection light concentrating element (this latter is not indicated in FIG. 10). The LED-s 71 are on one common substrate 69.

As an example, in FIG. 11. the optical system of a module can be seen in vertical cross-section, including a LED 70 and a internal reflection light-concentrating element, namely a pyramid-shaped 65 mirror box.

As shown above, the number of light sources S and their periodicity fundamentally defines the angle resolution of the apparatus. If we increase the number of light sources S, while realising them with small physical size, a spatial (3D) image with good angle resolution and great depth of field may be generated. In the following parts examples are shown, in order to demonstrate the principle of the apparatus.

FIGS. 12–15 show that a display 53 with larger size may generate several displays $50_1$–$50_4$, or eventually several light sources S. For example, if a smaller resolution is sufficient on the screen 20, four separately controlled, 640×480 pixel display $50_1$–$50_4$ may be formed on one 1600×1024 pixel display 53. In such a case the optical axis going through the smaller displays $50_1$–$50_4$ can be separated from each other with the help of known optical devices, such as prisms 41, and the pictures provided by the individual displays $50_1$–$50_4$ may be projected independent of each other with the help of separate imaging lens 40. The 43 and 44 oblique prisms (see FIGS. 14 and 15) may offer a similar solution, if the optical axis only needs to be shifted marginally in the lateral direction, either horizontally or vertically. It concludes from the above that along the horizontal direction as many pixels are required as possible, since the three dimensional direction resolution is determined by number of light beams leaving the individual pixels. If there arc x screen points in the horizontal screen line, and an number n light beams $L_c$ can leave from each of them, than an x*n number of pixels are required horizontally. In other words, the bigger the number of pixels we are able to position and image on a given horizontal screen line, the greater the number of directions in which light beams may be emitted from each screen point, if the horizontal image resolution (the number of screen points P on a horizontal screen line) is fixed.

Figure 16:
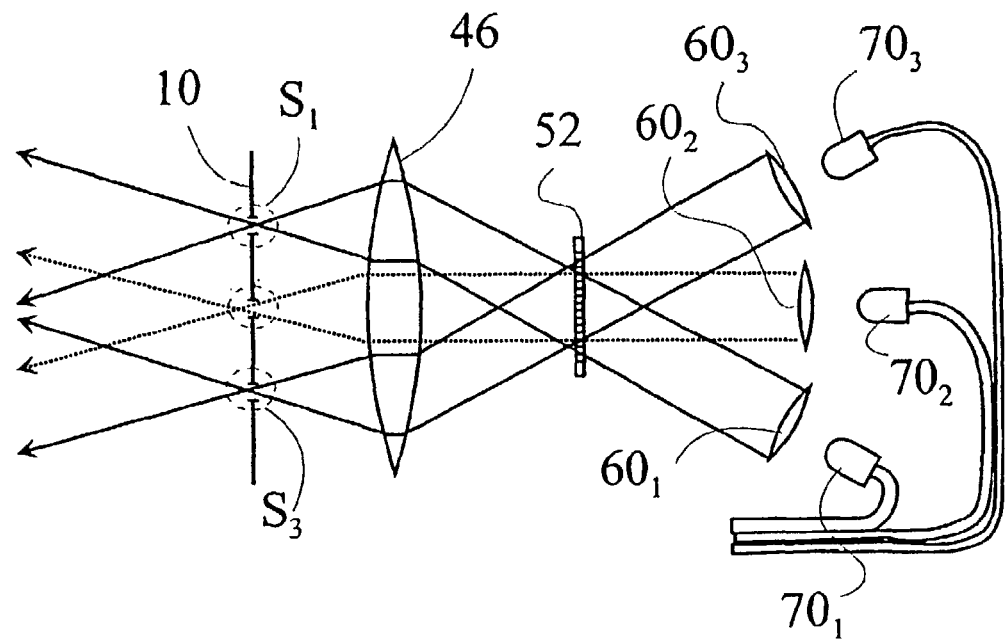
FIG. 16. illustrates a further version of several image generating means equipped with a single display, where distribution is not spatial, but in a time sequence.

FIG. 16 shows that theoretically a display 52 offering a faster frame frequency can replace more, slower displays 50 on the basis of the spot/sec requirements. In such cases the light sources $70_1$–$70_3$ illuminate alternately and synchronised with the frame frequency of the display 52, and accordingly, the display 52 "serves" the virtual light sources $S'_1$–$S'_3$ cyclically. The virtual light sources $S'_1$–$S'_3$ appear spatially separated, in accordance with the angle-based distinction between the light sources $70_1$–$70_3$ with separate collimators $60_1$–$60_3$. The fast display 52, the lens focusing on the appropriate points of the 10' light emitting surface may be realised by a common imaging lens 46, as it is shown in FIG. 11, but it may also be realised by combining several independent imaging systems.

Figure 17:
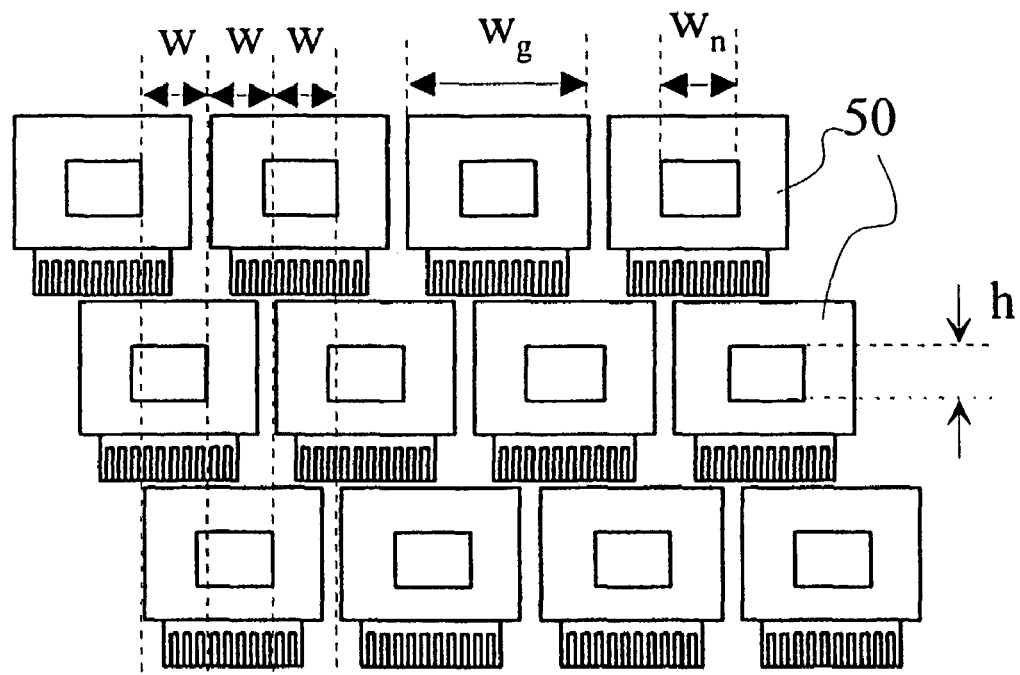
FIG. 17. illustrates the relative position of the individual image generating means towards each other when placed in several rows.

In FIG. 17 we demonstrate that it is possible and even desirable to increase the number of display pixel available horizontally. In such cases the two dimensional displays 50 should preferably be placed in several parallel lines shifted in relation to each other in the direction parallel with the direction of the lines. Depending on the relation of the net width $w_n$ and the gross width $w_g$, and the h height of the individual displays, the displays 50 may be placed in two, three or more lines so that there are more pixels available parallel with the lines, typically in the horizontal direction. Following from the above, the horizontal shift w must be chosen in a way that the central optical axis of the individual displays 50 should be shifted by regular periods along the horizontal direction. This way it can be assured that the light beams laterally deflected by the lens 40 arrive at the appropriate screen-points P, and the emitting angles of the light beams $L_c$ leaving the individual screen points P show regular distribution.

Usually, but not necessarily, the shift w is chosen to be equal with the quotient of the gross width $w_g$ of the display 50 and the number of the lines created. Usually, the two line arrangement is optimal, because if the 54 control outputs of the individual displays 50 are IS set up and down, the displays 50 may be positioned so close that an ideally continuous, long horizontal display may almost be achieved.

FIG. 3 depicts an arrangement, where the individual modules 45 along the screen 20 are practically shifted along a straight line parallel with the screen 20, but otherwise are at the same angle compared to the screen 20 and they are optically completely equivalent. As opposed to this, we demonstrate on FIGS. 18–21 that the individual modules 45 and the screen 20 can be also grouped in different geometrical arrangements.

Figure 18:
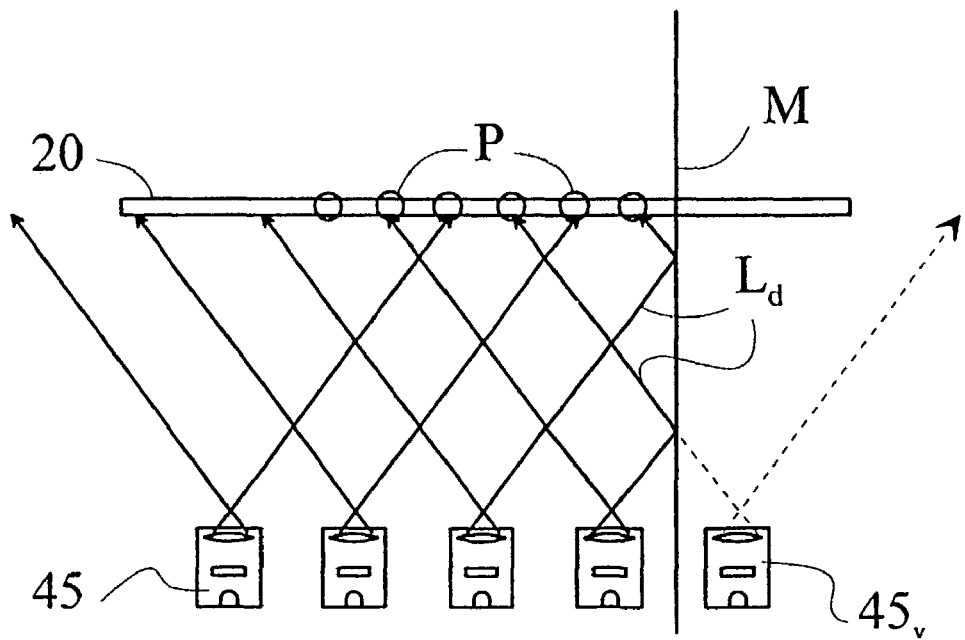
FIG. 18. illustrates the optically symmetric arrangement of the individual modules and the screen.

FIG. 18 represents the principle of this optically uniform arrangement, which is especially advantageous from the point of practical implementation. The individual modules 45 are optically equivalent, i.e. contain the same 40 imaging lens. This makes mass production of the modules 45 easier, and makes them interchangeable. Since they are shifted parallel with the screen 20 along a straight line, but are at the same angle to the screen 20, there is no optical keystone distortion related to the screen 20 and the optically symmetric arrangement of the modules 45 facilitates the collective imaging. The arrangement can be freely expanded by selecting the number of the modules 45, therefore either 4:3, 16:9 or other displays with optional proportions can be implemented.

The light beams arriving at the marginal P pixels can be also be generated by closing the space laterally between the screen 20 and the modules 45 with a mirror M and return those beams $L_d$ to the screen points P of the screen 20, which otherwise would not reach the screen 20. The reflected beams can be regarded as if had been emitted by the virtual modules $45_v$. It can be demonstrated that the number of light beams $L_d$ falling outside the screen 20 from the inner modules 45 is the same which would have to be generated for the marginal screen points P with such virtual modules $45_v$. Therefore, placing mirror M at the edge of the screen 20, the light beams heading outside the screen from the inner modules can be completely utilised and the total width of all the modules 45 does not exceed the width of the screen 20, that is the apparatus may remain relatively compact in size.

Figure 19:
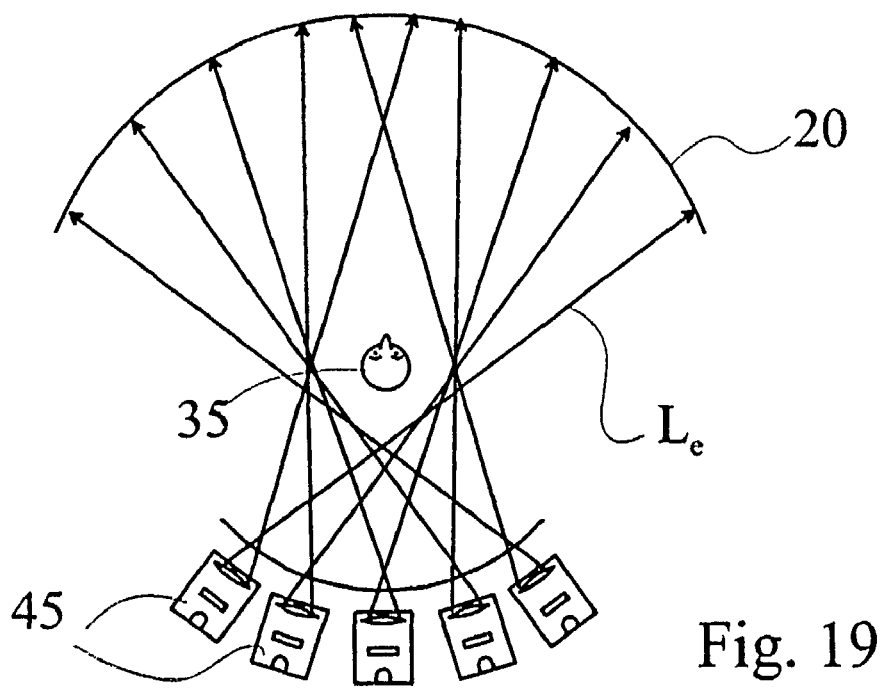
FIG. 19. illustrates another version of the optically symmetric arrangement of the individual modules and the screen.

FIG. 19 also demonstrates an example of an optically symmetric arrangement. Substituting shift along a parallel straight line with a cylindrically symmetric transformation the modules 45 and the screen 20 are arranged along a curve. For example, due to reasons of symmetry it is advantageous to arrange the screen 20 on a circular arc concentric with one made up by the modules 45, as being demonstrated by the arrangement on FIG. 20. The screen 20 can be a cylindrical surface or a spherical surface advantageous from the point of projection. The radius of the circular arc shaped screen 20 can be larger, equal or smaller than the radius of the circular arc formed by the modules 45. The proportion of the radiuses determines the number of modules having a given size along the circumference, its distance from the screen surface, that is the relation of the angle resolution and image resolution of the system. The arrangement can be extended to the whole circular arc, that is to a 360° range, this way creating a three-dimensional view for the observer with a complete viewing angle. expediently for virtual reality systems or simulators. In large-scale systems, like flight simulators, the modules can be advantageously realised with projectors. The screen 20 can be reflective or retroflective, which is explained in detail in connection with FIGS. 28 and 33–34.

Figure 20:
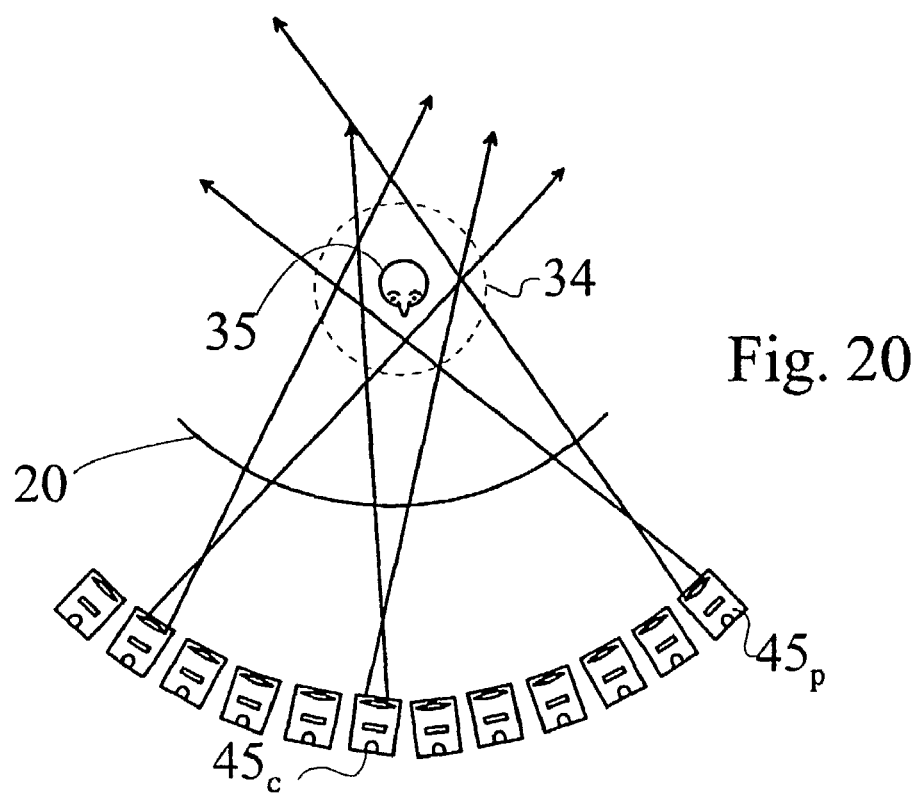
FIG. 20. illustrates another version of the optically symmetric arrangement of the individual modules and the screen.

The screen 20 can be made transmissive in the arc-shaped arrangement as demonstrated in FIG. 20. Since the range of the emitting angles towards the convex surface of the arc-shaped screen 20 is much larger than towards the concave side, it is also preferred to orient the modules 45 along the circular arc towards the common region, i.e. the centre of the circular arc, the modules 45 and the screen 20 are preferably arranged on the same side of the circular arc. The modules 45 are preferably on circular arc with a larger radius, and the screen 20 is on the circular arc with a smaller radius. The 35 observer will still observe the 3D image on the circumjacent screen on a wide-angle in the 34 range. It is visible, that the central 45c modules arc in an optically equivalent position with the 45p peripheral modules due to the circular arrangement. The modules 45 and the screen 20 can theoretically create a complete circular arc, where the screen 20 is a cylindrical or a spherical surface.

Figure 21:
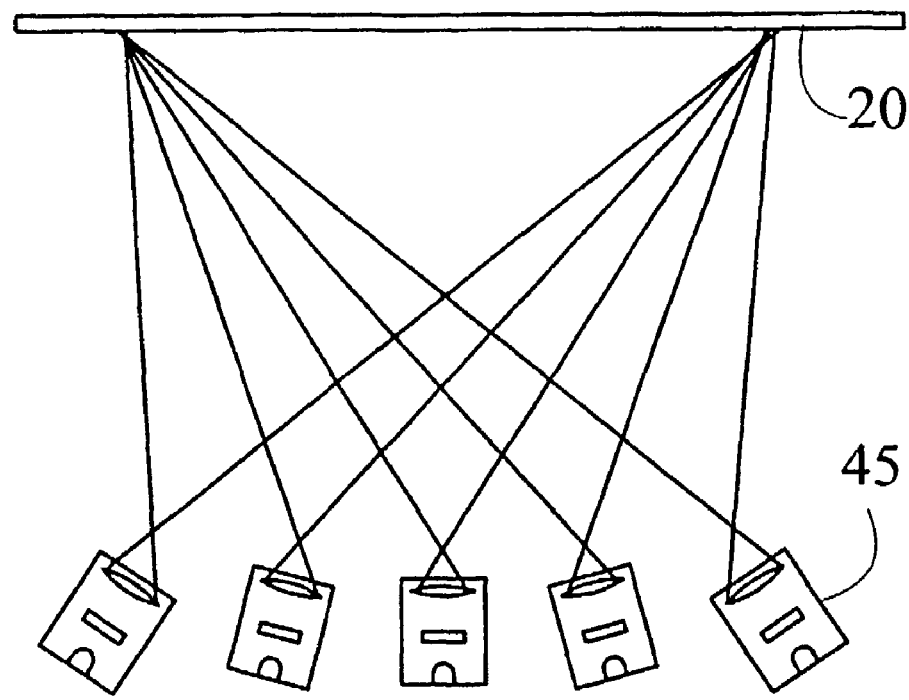
FIG. 21. illustrates another version of the optically asymmetric arrangement of the individual modules and the screen.

FIG. 21 shows an optically asymmetric module-screen arrangement, where the screen and the modules are substantially lined up along a straight line, but the optical imaging of the modules are not the same; their angle with the screen 20 differs towards the edges and their imaging is also asymmetric due to the uniform distribution of the P pixels of the screen 20, usually showing a keystone distortion. The collective imaging can be realised where the image is pre-distorted by software, so that that the optical distortion is compensated by the software in this manner. However, due to the pixel character of the images, disturbing effects may arise when the images of the adjacent modules are combined.

Figure 22:
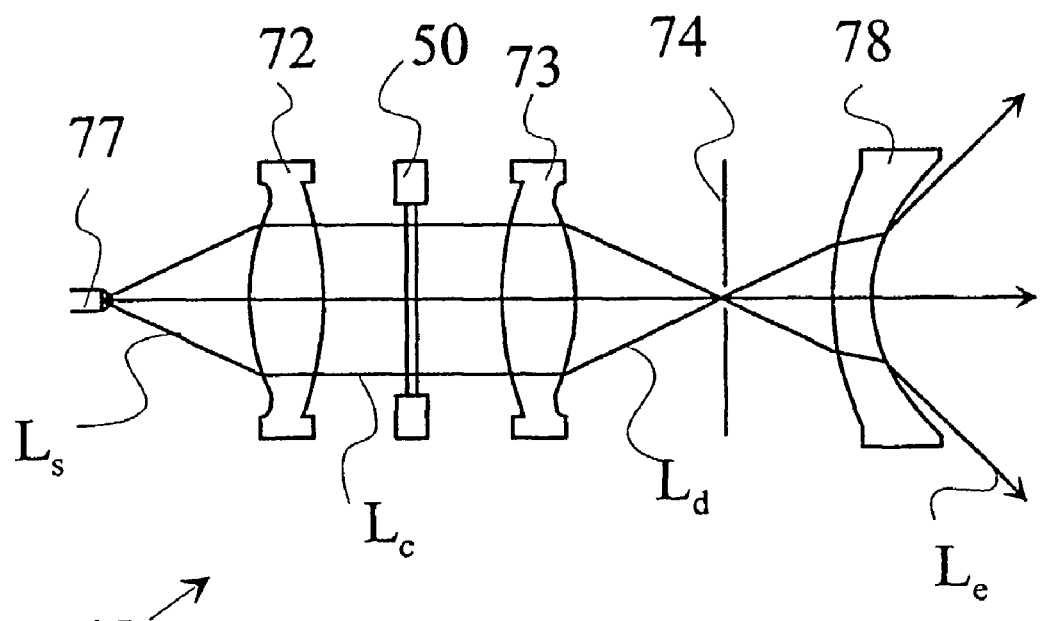
FIG. 22. illustrates the principle of the optical arrangement applied in the individual modules.

We demonstrate the practical implementation of the optical system of a module 45 in FIG. 22. The light source is the end 77 of an optical fibre 75. The emerging light beams $L_c$ are collimated by the first aspherical lens 72 into a parallel beam. The beam passing through the display 50 is focused by the second aspherical lens 73 to the lens aperture 74. After the spatial filtering by the lens 74 aperture the beam angle of the divergent beams is increased by a dispersing lens 78. The dispersing lens 78 is a convex-concave lens the convex side of which is towards the light source on the optical axis and its refraction coefficient expediently differs from that of the lens 73 for colour correction. This optical system is designed so that the essentially uniformly distributed incident light beams $L_c$ are deflected essentially uniformly within the angle range β. However, the difference of the deflection angles between central beams need to be relatively larger, while the difference of the deflection angles between peripheral beams are relatively smaller. This is necessary, so that the deflected light beams $L_d$ defines uniformly distributed screen points P on the screen 20, or correctly illuminates the physically predetermined screen points P.

Figure 23:
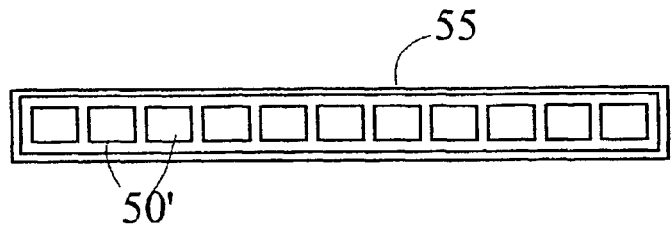
FIG. 23. an improved version of the realisation of the image generating means.
Figure 24:
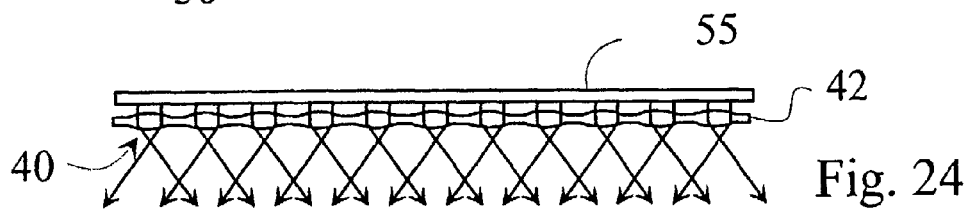
FIG. 24. top view of the arrangement of FIG. 23.

FIG. 23 shows the front view of a large size 55 display, which has the complex images containing the image details to be projected in the different emitting directions set next to each other along its long and narrow effective area. The individual images can be regarded as if had been created by a 50' virtual display. This solution enables the 50' virtual displays to be placed tightly next to each other. FIG. 24 shows a top view of the 55 display together with the 40 lenses, which are integrated into a collective 42 optical plate. The 40 lenses perform the imaging of the individual 50' virtual displays, i.e. the imaging of the adjacent images generated by the 55 display.

Figure 25:
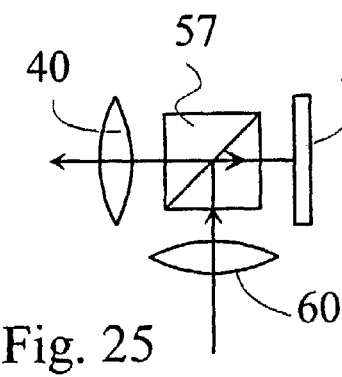
FIG. 25. another realisation of the optical system used in the modules, shown in a view perpendicular to the optical axis.
Figure 26:
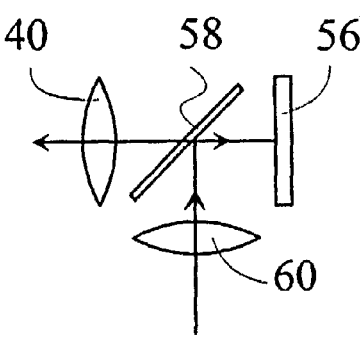
FIG. 26. a modified version of the optical system of FIG. 25.

FIGS. 25–26 demonstrate the possible configuration of the optical system of the modules 45 if the displays 56 operate not in a transmission, but reflection mode.

It is expedient here to use for 56 display such micromechanical displays, where the light is deflected by reflecting plates operated by integrated circuit technology or by moving band-like structures behaving as optical gratings. Such a solution is the micro-mirror matrix of the DMD chip from Texas Instruments. According to the beam path in FIG. 25, the light is projected on the display 56 via the divider prism 57 from the collimator 60 and reflected from that to the divider prism 57 towards the optical lens 40. Preferably, the divider prism 57 is a known polarising divider prism for LC micro-displays or a totally reflecting (TIR) prism for the micro-mechanical displays.

Figure 27:
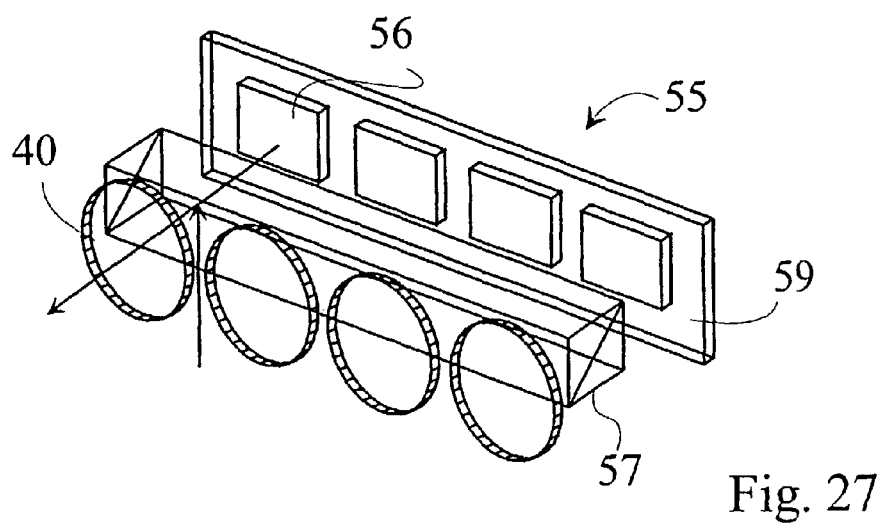
FIG. 27. a perspective, theoretical view of a version of the optical system of FIG. 25.

FIG. 26 displays a variety where the role of the 57 dividing prism is taken over by the semi-transparent plate58. Both versions can be built by using a common, long display 55 and single, long divider prism 57'. The latter version is displayed on FIG. 27. Similarly to the display 55 in FIG. 23, the display 55' can have a single, common effective area, where the displays of the individual modules are only logically separated, but it is also viable (as visible in FIG. 27) that the physically separate displays 56' of the individual modules are fixed on a single, common base board 59.

Figure 28:
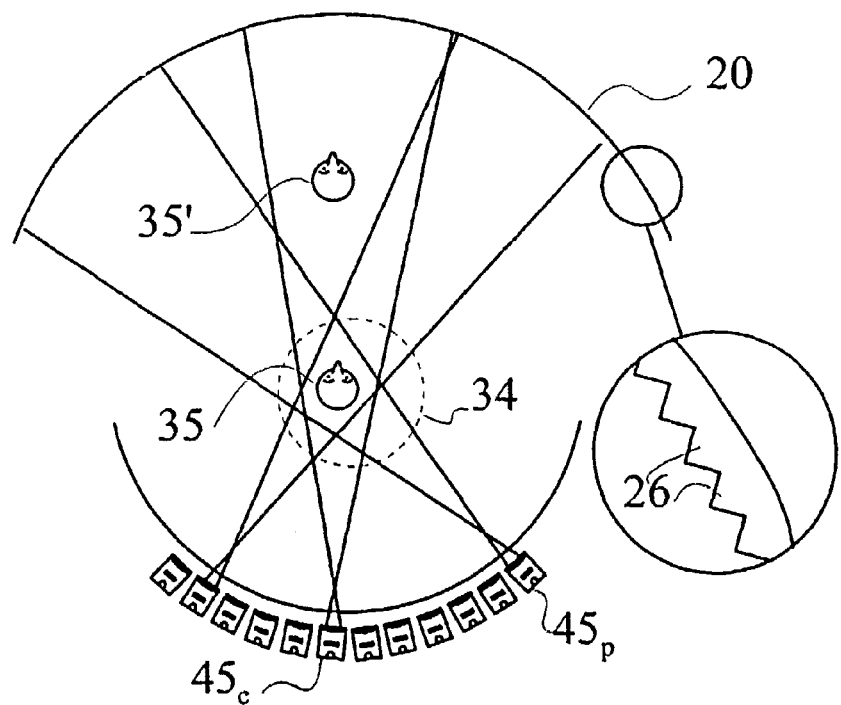
FIG. 28. the principle of another version of the screen with the related module arrangement, and showing the structure of the screen.

FIG. 28 demonstrates the position of the modules 45 and the screen 20, where similarly to FIG. 20 the screen 20 and the modules 45 are located along concentric circular arcs. It is important, however, that the screen 20 here is retroreflective, that is the incident light beams are reflected towards the same direction. In order to be more precise, this feature of the screen 20 is only realised horizontally, in other words in the plane of FIG. 28. The vertical reflection from the screen 20 is normal mirror-like, that is the incident angle is the same as the emergent angle, but the component of the light beam along the vertical plane remains constant. This is required, because otherwise the light beam would always be reflected to the modules 45 and would not reach the eyes of the observer.

An important feature of the arrangement in FIG. 28 is that due to the arched, horizontally retroreflective screen 20 the diverging light beams emitted from the individual modules 45 converge again when reflected and the whole surface of the screen 20 will be visible in a relatively narrow range 34, about the area around the head of the 35 observer. To be more precise a three-dimensional view, which practically covers the area of the whole screen 20 is only generated in this range 34. It is also visible that the centre of this 34 range is practically the common centre of the concentric circles created by the modules and the screen 20. However, in this narrow 34 range the direction resolution (the angle resolution) of the 3D image will be high, because only with a small lateral movement light beams can be observed emerging in different directions from the individual screen points. In other words, the different angle views provided by the apparatus divide this narrow range among each other, so the difference between the emitting directions will be small. This means that the observed 3D effect will be very realistic, but there is no need to associate many emitting directions to the individual screen points of the screen 20, which would otherwise require a large number of modules or high-resolution displays in the individual modules. It is also visible that as the observer moves closer to the screen 20, the region covered by the emitting angle range of the screen 20 becomes narrower. E.g. if the 35 observer moves into the position 35', only the light beams generated by the module 45$_c$ reach the eyes of the 35 observer, while the light beams from the marginal module 45$_p$ avoid the observer.

The screen 20 is retroreflective, because its surface facing the modules 45 is covered with vertically aligned right-angled 26 prisms the horizontal cross-section of which is depicted in the enlarged detail of FIG. 28. A surface with such an embodiment is retroreflective in a given direction, in a manner known per se (these directions are in a plane being perpendicular to the longitudinal edge of the prisms). This means that the emitted light beams in these planes exit parallel to the incident light beams, but in the opposite direction.

Figure 29:
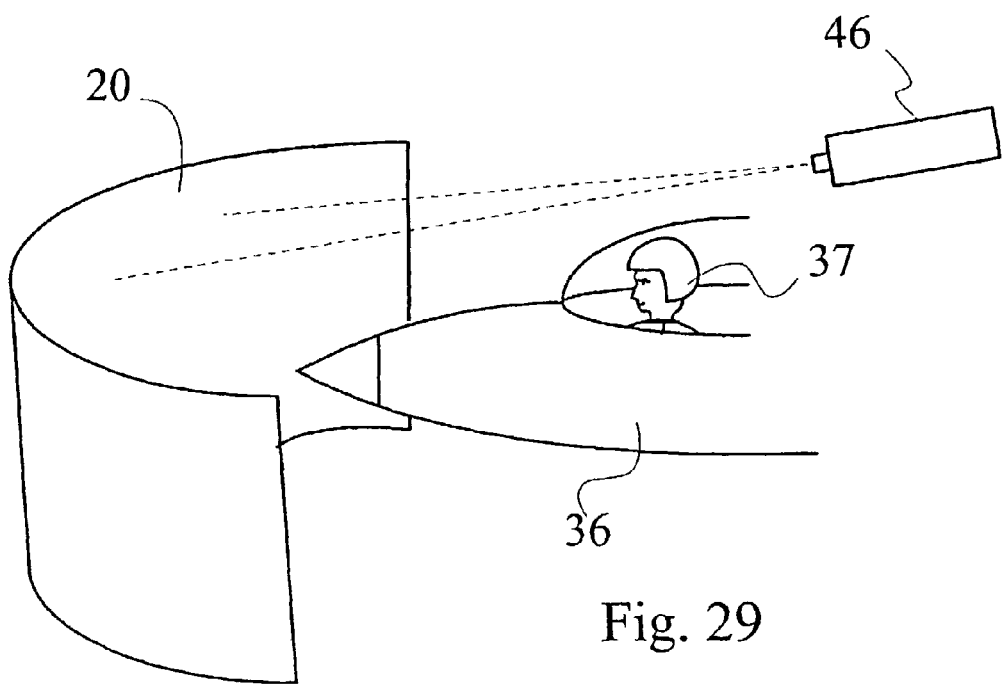
FIG. 29. illustrating a practical application of the arrangement in FIG. 28.

FIG. 29 represents a practical application of the arrangement of FIG. 28—a flight simulator. The three-dimensional view of the landscape seen by the pilot appears on the screen 20, but this view will be visible only for pilot 37 sitting in the cockpit 36, which simulates the cockpit of a real aeroplane. One or more projection units 46 behind and above the cockpit 36 contain the modules 45 producing the light beams that produce the view for the pilot 37.

FIG. 30 presents the three-dimensional structure of a possible realisation of the screen 20 as well as the 30$a$ horizontal and 30$b$ vertical cross-sections for better demonstration. There is provides a series of so-called lenticular tenses, i.e. cylindrical lenses with larger radius of curvature on one surface and smaller radius of curvature on another surface of the screen 20. The cylindrical lenses 31 with larger radius of curvature provide the smaller, approx. 1–2 degree horizontal diffusion of the light beams L$_e$, as depicted by the angle δx in FIG. 5 and FIG. 7$a$. The cylindrical lenses 32 with smaller radius of curvature provide the larger, approx. 100 degree vertical diffusion of the light beams L$_e$, as depicted by the angle δy in FIG. 7$a$. The screen 20 can be made of low cost, optical quality plastic with a known technology, for example injection moulding. Diffusion can be achieved both with a reflection screen 20 (see FIG. 31) and a transmission screen in a one or several layer structure. In the case of a reflection screen it is enough to produce cylindrical lenses that create half of the desired diffusion, because due to reflection the light beams pass the screen 20 twice and diffusion is achieved after the second pass. Theoretically, it is also possible to produce the optical surface creating both the horizontal and vertical diffusion on the same surface of the screen 20.

FIG. 32 depicts a version of the screen 20 where a holographic layer 33 instead of cylindrical lenses achieves the desired diffusion of the light beams. The holographic layer 33 can create vertical and horizontal diffusion at the same time, even to different extents.

Figure 33:
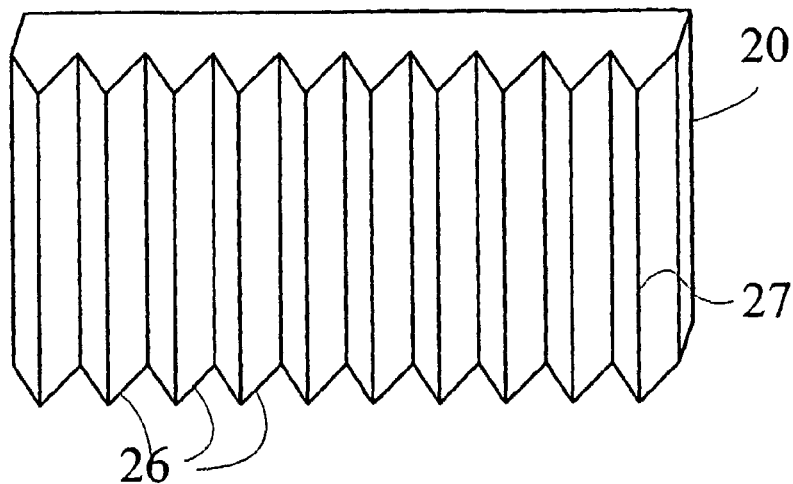
Figure 34:
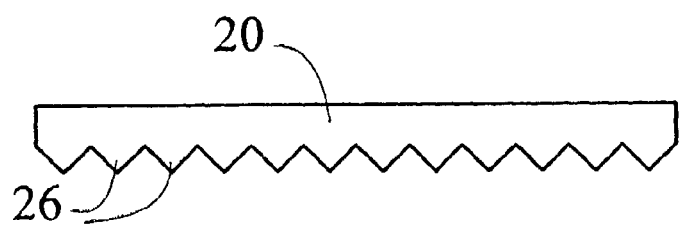
FIG. 34. the section of the screen in FIG. 33.
Figure 35:
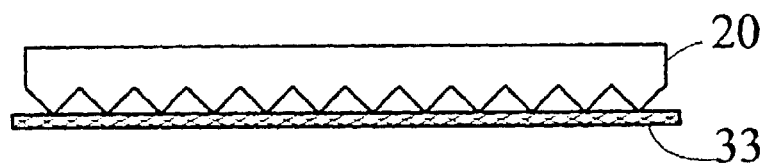
FIG. 35. the section of the screen in FIG. 33 with a additional screen.
Figure 36:
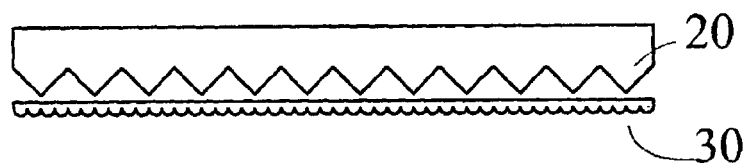
FIG. 36. the section of the screen in FIG. 33 with another type of additional screen.
Figure 37:
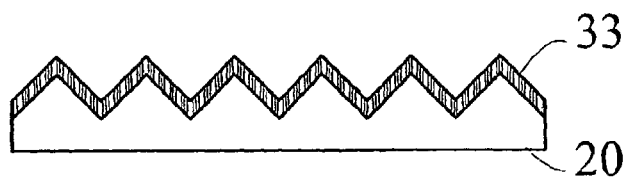
FIG. 37. the section of the screen in FIG. 33 with a surface configuration performing the functions of the accessory screen in FIG. 35.

In FIGS. 33 and 34, we demonstrate that a screen 20, which is retroreflective (in one dimension) can be produced by creating right-angle prisms 26 on the screen 20 (see FIG. 28 as well). The retroreflective effect is established in the plane perpendicular to the longitudinal edge 27 of the prisms 26. Light beams on planes being parallel with the longitudinal edge 27, or more exactly, the components of light beams falling in these planes are reflected from the screen 20 as a simple mirror. FIGS. 35 and 36 demonstrate that the 30 diffusing screen or the holographic layer 33 placed in front of the retroreflective screen 20 provides the required divergence of the emitted light beams L$_c$. FIG. 37 shows a version where the holographic layer 33 is put directly on the retroreflective surface with an appropriate technology, for example replication.

Figure 38:
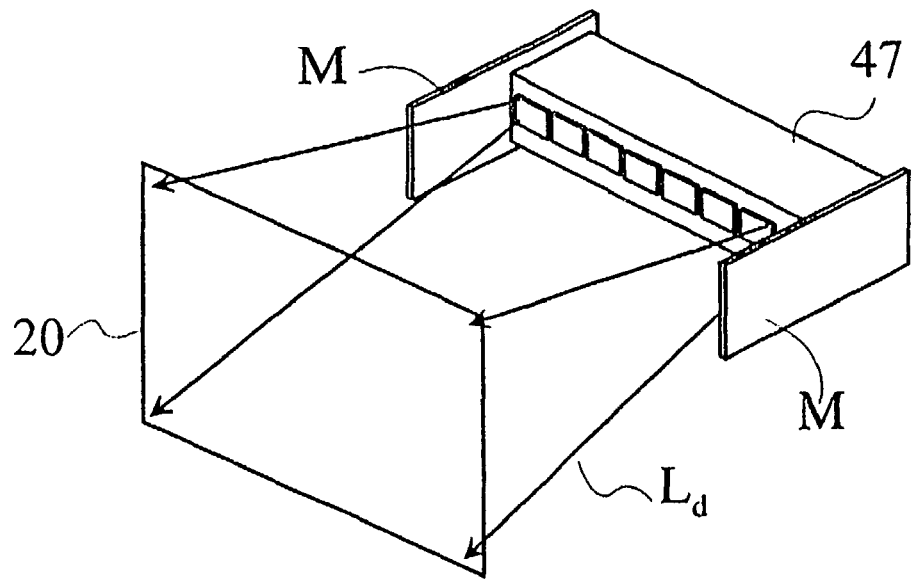
FIG. 38. the perspective view of another embodiment of the inventive apparatus.

We present a relatively simple embodiment of the 3D display apparatus of the invention in FIG. 38. This apparatus only produces 3D still images and as such, it is excellent for advertising purposes, for example. The projector 47 of the apparatus contains the modules (these are not represented in FIG. 38) that emit the light beams L$_d$ according to the above-described principles towards the screen 20, which is usually positioned separately from the projector 47. There may be M mirrors on both sides of the projector 47 if required, with the help of which the width of the 47 projector can be reduced according to the principle described in connection with FIG. 19. The inner structure of the projector 47 of the apparatus in FIG. 38 is shown in FIG. 41 with the difference that FIG. 38 contains a single line of modules, while FIG. 41 depicts a double line arrangement.

The projector 47 and the screen 20 may be in a reflection arrangement (see FIG. 39), that is the projector 47 can be fixed on the ceiling 90 and the screen 20 can be installed on the wall (not shown in the image) of the room. This arrangement is advantageous, because the projector 47 can be positioned far from the screen 20. This arrangement can provide 3D images with a good angle resolution and large depth of field. Namely, it is conceivable that the direction resolution of the 3D images, that is the angle between the adjacent emitting directions will be determined by the distance between the screen 20 and the modules 45, and the distance between the individual modules 45. Observers watching a screen 20 in reflection arrangement are in front of the screen 20 compared to the projector 47 and under its plane, therefore a relatively large size screen 20 can be used in a relatively small room as well. The apparatus provides a 3D view in front of and behind the screen 20 and this way the rooms can be optically enlarged.

Figure 40:
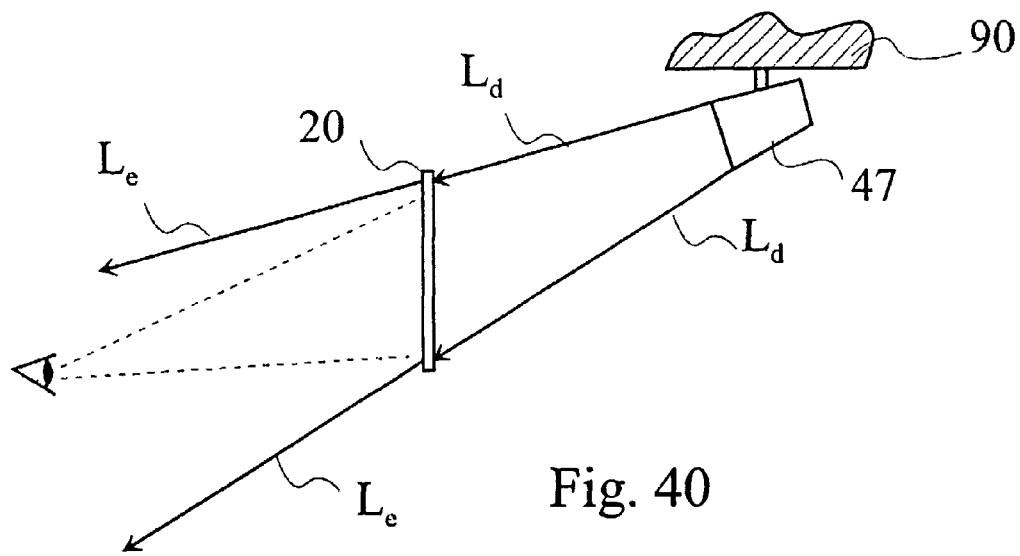
FIG. 40. illustrates another way of application for the apparatus in FIG. 38.

The screen 20 can also be made in a transmission version, that is the light beams $L_d$ emerging from the projector 47 pass through the screen 20 and the light beams $L_e$ emerging from the other side of the screen reach the eyes of the observer. This arrangement is shown in FIG. 40. In this case, the projector 47 need not be positioned higher than the observers, but can be placed at the same level or lower. The advantage of this arrangement is that the projector 47 can be in another room, since the observers do not see the projector 47.

Figure 41:
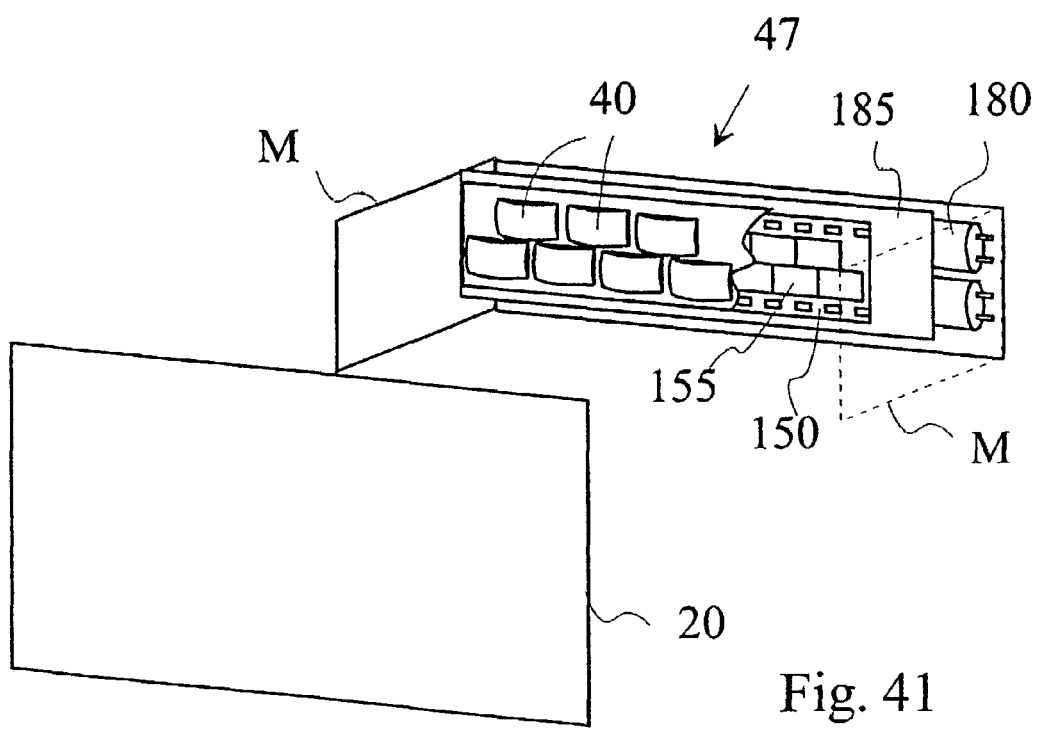
FIG. 41. a partly cutout view illustrating the basic structure of the apparatus in FIG. 38.

FIG. 41 shows the structure of the still image display 3D apparatus. Since only still images can be projected, the role of the two-dimension displays in the projector 47 is taken over by a device projecting a constant image, for example a 150 slide film, or in a given case a reflection mode image carrier. The composite images 155 are imaged by lenses 40 on the screen 20, which may be closer or further from the projector 47. The composite images 155 are positioned in the appropriate geometry in the slide film 150, for example in a double line arrangement as shown in FIG. 41. Mirrors M can substitute the modules creating the appropriate views of the edge screen points of the screen if required, as explained in FIG. 19. The images 155 in the slide film 150 are lit from the back by light tubes 180 or incandescent bulbs known from cinematic apparatus, or LEDs with an optional homogenising diffuse plate 185. The slide film 150 can be quickly and easily replaced if another image is to be displayed with the projector 47. A version of the automatic mechanism effecting periodic replacements as known with alternating bulletin boards can also be applied. The individual complex 155 images can be created on the slide film 150 with the appropriate methods, with digital imaging technology, for example. The slide film is suitable to act as a two-dimension display, because small size colour images with high resolution can be created and it essentially simulates the long and narrow effective area of the ideal large-size display shown in FIG. 23. The 3D display apparatus shown in FIG. 41 can be manufactured simply and at a low cost, and it is capable of displaying excellent quality pictures with 3D sensation.

It is noted that when the slide film 150 is lit through the diffuse sheet 185, not only the light beams perpendicular to the plane of the image 155 pass through the film 150, but other light beams with other directions as well. The 40 imaging optics with a relatively small numeric aperture can only image those beams which enter in a low cone angle, while the other, more oblique light beams are lost in the optical system. In other words, the imaging lenses 40 practically make use of the approximately parallel light beams on the slide film 150. Therefore, it is also true in this case that in the projector 47 there is an optical system projecting the images generated by the image generating means—the 150 slide film with the 155 images in this case—to the optical deflecting means, that is the 40 imaging optical lens, with essentially parallel light beams. Based on the above, the system utilises the light passing the 155 images relatively inefficiently, but this is compensated by that the brightness of the displayed 3D image is determined by the cumulated light output of the 155 images.

Figure 42:
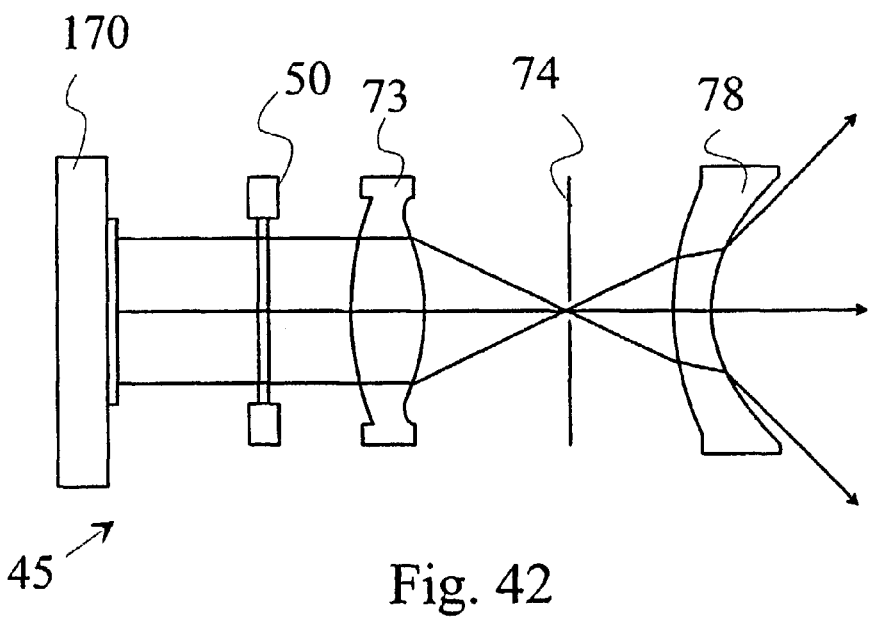
FIG. 42. a further version for the concrete realisation of the modules used in the apparatus with a similar scheme as in FIG. 22.

FIG. 42 shows another version of the optical imaging system used in the modules 45. The 170 LED matrix provides the back lighting for the 50 display. In order to archive the greatest brightness, the highest possible number of light sources have to be placed behind the 50 display. This can be achieved by fixing the non-cased LED chips on a common substrate in a method known from the integrated circuit technology and wire them together or to the appropriately designed output with a fine, usually gold metal thread (bonding). This way the chips can be placed every 0.4–0.5 mm, even a hundred of them behind an average size display. This way a perfectly homogenous, although costly light source is provided, with extraordinary surface brightness, and with good colour mixing and saturation. The marginal beams of the diverging beam emerging from the 170 LED chip matrix are absorbed while passing the small numeric aperture lenses 73 and 78 and substantially the light emerging perpendicular to the surface of the LED chip 170 matrix is utilised in the system. The LED chip 170 matrix can be multicoloured, e.g. the LEDs 171 of the usual RGB colours can be in the appropriate grouping as shown in FIGS. 43 and 44.

For better light utilisation, a beam forming collimating lens may be provided between the LED chip matrix 170 and the display 50 to collimate the outbound beams emitted in a wide angle. This beam forming collimating lens may be expediently realised as a microlens matrix or an internal reflection light integrating or light paralleling component, in a size identical with the chip matrix. Expediently, such a beam-shaping component may be an expanding truncated pyramid shaped mirror box (see FIG. 10) or a conically expanding plastic or glass component. In this manner, the number of the chips can be reduced and standard RGB chip LEDs, for example Samsung or Marl made device can be used.

Figures 43, 44:
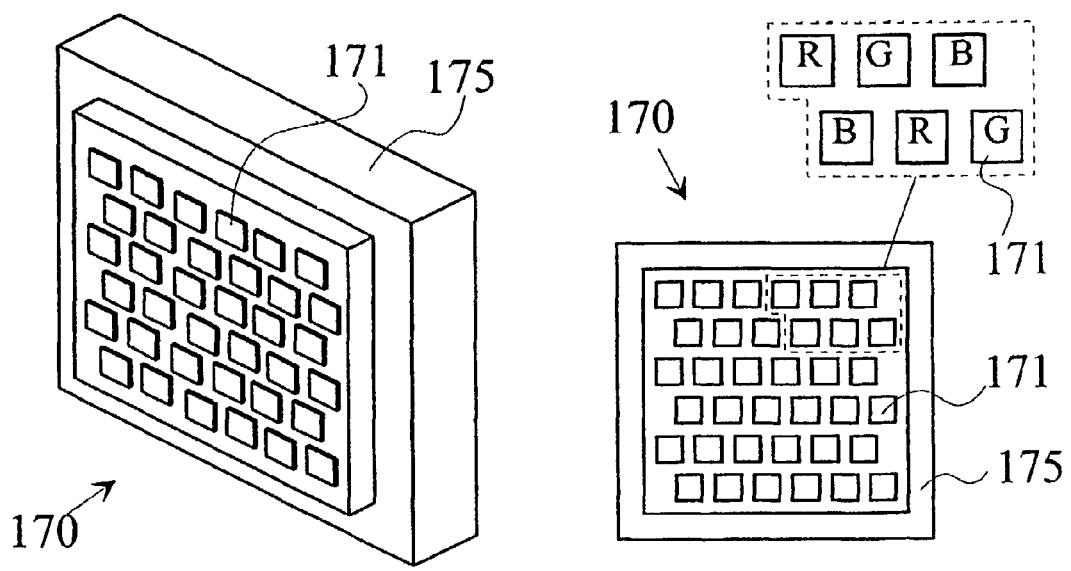

In the case of the RGB coloured LED illuminator shown in FIG. 44, the display 50 is monochrome and the consecutive colour images are created by the cyclical switching of the LEDs 170 belonging to the R, G, B colours. This may be done so that every colour is switched on once within a 1/30 s long frame. Evidently, this requires the appropriate frame frequency 50 display, i.e. in this case the images are to be displayed on the display 50 at about 90 1/s frequency. This way the application of colour LCDs in the modules 45 can be avoided. In a known manner, in colour panels large pixel numbers are used, with RGB filters at third-resolution pixel triplets, or alternatively, three (RGB) individual panels are used in the colour LDC displays. In the case of a display apparatus operating with parallel LCDs, a further tripling the panels is not economic. Reducing the resolution of the display, however, results in the reduction of deflection directions, that is the deterioration of direction resolution. Therefore, time sequential colour control can be realised by using high-speed ferroelectric liquid crystal (FLC) panels and by framing the RGB images after each other with a 3×framing frequency. As a further advantage, this results in a better colour mixing than the display with pixel-level colour mixing.

The display 50 may also be embodied by a LED or OLED display (organic LED). In this case, there is no need for a separate light source and a display. The LED or OLED display itself combines the functions of the light source and the image generating means. Beside the light beams emitted in a parallel direction, there will be other beams as well, but, as mentioned above, the deflecting optics will only image the substantially parallel beams onto the screen.

Figure 45:
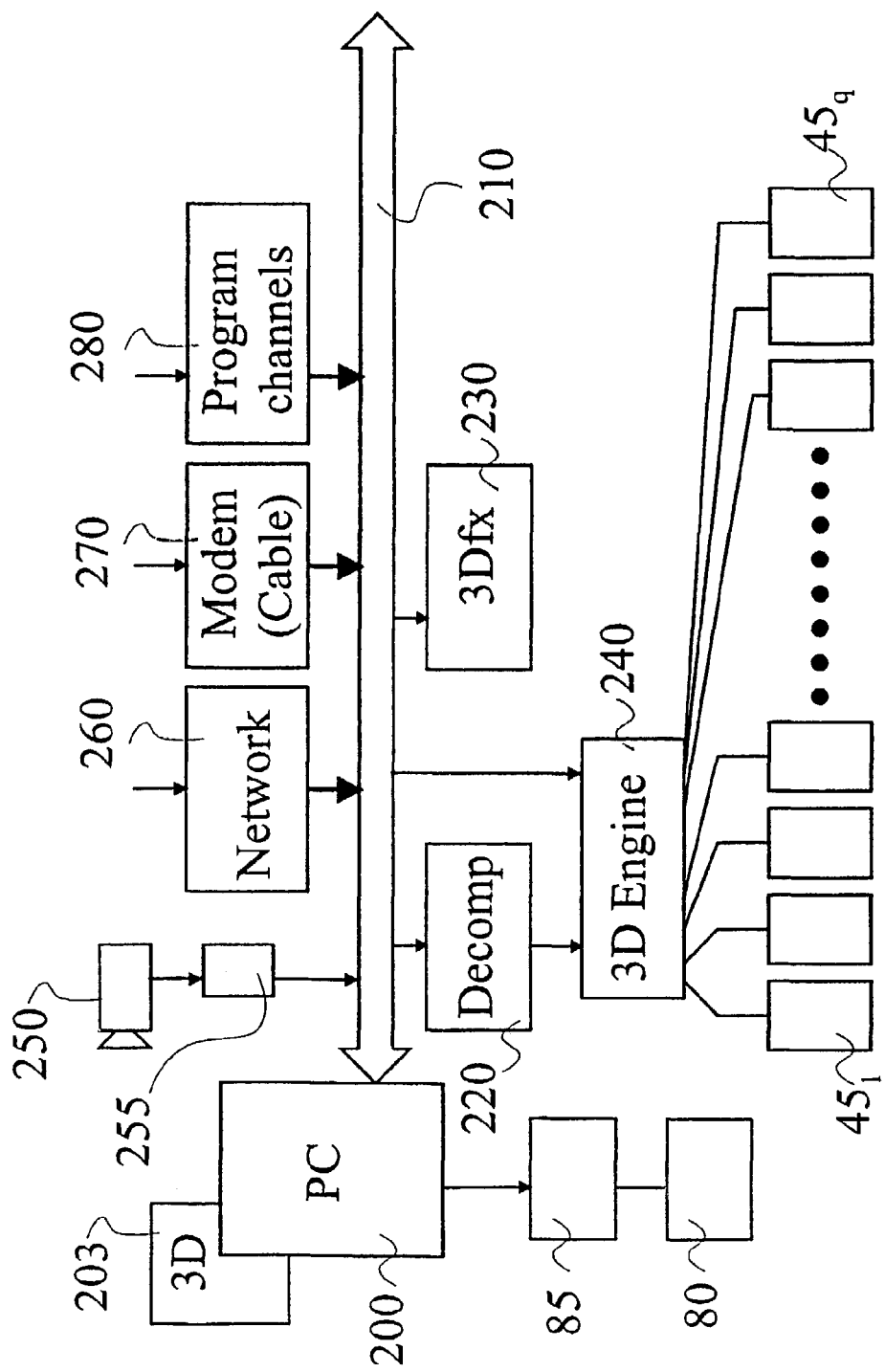

FIG. 45 shows a schematic layout of the control system of the apparatus. In the age of the convergence of broadcasting, telecommunication and computer technology the basic functions of information systems, transfer, storing and processing of data arc essentially independent of whether the digital signals carry audio, visual or computer data. Modem apparatus, which can be integrated into a system also has to be prepared accordingly so that it can handle any signal, carrying 3D (visual or geometric model) information, possibly without the modification of the hardware. The monitors, televisions and other display devices generally handle input signals of different standards with dedicated circuits. Therefore, the control unit of the apparatus in the invention is basically configured as a computer 200, a personal computer (PC) for example, so that it converts the input digital or analogue 3D data according to a given format or protocol onto a standard computer bus 210, e.g. a PCI bus via input interface (expansion) cards. This configuration enables the subsequent creation of new physical inputs.

The input data of the system can originate from different sources. As an example, we depicted a network interface 260, a wire modem 270 and a radio/TV receiver unit 280 in FIG. 45, which all connect to the bus 210.

A camera 250 can be connected to the equipment via an input unit 255, which provides data for self-calibration, head-tracking and the measurement of environmental light conditions.

Following processing by the software 203, or directly, the incoming 3D data reaches the 3D unit 240 connected to the same bus 210, which is also physically configured as a (PCI) expansion card. The card expediently contains great complexity programmable logical ICs (FPGA). The task of the 3D unit 240 (3D Engine) is to produce the appropriate complex (module) image in real time and transfer it to the individual $45_1 \ldots 45_q$ modules The functions of the computer 200 can also be realised with control circuits 100 (see FIGS. 8 and 10), but the control circuits 100 themselves generally only receive the data of the 3D unit 240 and control the modules 45 on that basis.

The 3D unit 240 operates in different modes according to the different input data:

- Plane image display. It fills the appropriate pixels of the displays 50 of the $45_1 \ldots 45_q$ modules, so that the appropriate P pixel of the screen 20 emit light beams in all directions with the colour and intensity value of the given screen point of the recognised traditional standard 2D images.
- The processing of images with views corresponding to different viewing directions of any source, (computer generated or the photographing or filming of natural views). The images may be uncompressed or decompressed. Using the necessary geometrical data, it creates the composite (module) images by rearranging among each other the details of the images of different views.
- The processing of a image provided with less views than the apparatus is able to display. For example, all the views the apparatus can display are compiled from only five available aspects of an image. Although in theory, a large number of spatial images are required to reconstruct an essentially continuous 3D view. But the generation of all views of different viewing directions is usually not economic, especially in the case of real imaging. Therefore, the 3D unit 240 calculates the adequate number of intermediate views with the proper algorithms. Such solutions are known from U.S. Pat. No. 5,949,420 patent description, for example. The unit creates the composite (module) images with the same rearrangement as mentioned above, from the calculated, required number of intermediate views (and generally from the initial views, as well).
- The production of adequate number of 3D views from data of other platforms, such as DICOM, 3Dfx, VRML and other 3D CAD geometrical models. There is shown a 3Dfx module 230 as an example, which can be connected to the bus 210 of the computer 200 in a known way as a separate expansion card. A 3D software 203 of a known structure can be installed that creates the view image of adequate number and geometry from the described 3D object. The 3D unit 240 handles that similarly to the above.

Thus the compatibility of the apparatus with any platform is primarily the question of software. When setting the new standards, the 3D information may be attached as supplementary data to the image with a central viewing direction. In this manner, the 2D devices remain compatible and can display 3D signals, naturally with a plane view image only.

In a special application, the hardware of the apparatus may calculate the data of any intermediate view in real time. Therefore, it is possible to optimise the image perceived by the observer, according to the position of the two eyes of the observer. This means that only two views of the image is projected towards the eyes of the observer. The adjacent views, i.e. the overlapping of the adjacent view images, which may be already visible due to the diffusion of the screen, are switched off. In this manner, images with very good depth of field may be created (high depth mode 3D image). It follows from the features of the inventive system that eye tracking and the above mentioned observer-optimisation can be realised simultaneously for several observers. The control data for the eye tracking are provided by the camera 250 or other dedicated hardware.

Another application possibility is when the hardware of the apparatus calculates any view in real time, it can intervene in the construction of the image and modify it. Such an option can be the consideration of the environmental lights and lighting. Not only the brightness can be adjusted, but also the light beams flickering on given points of the objects, blurring shadows can be added. These are exactly those effects, the lack of which makes the observer recognise that the perceived image is only an artificial image. Therefore, the addition of this option can create an extremely plastic, realistic view (Reality mode).

Three-dimensional images contain much more information than a plane image. It is suggested to use data compression methods when transferring or storing 3D data. The similarity of the directional views of the images allows the use of effective compression methods. The algorithm already described above, namely the algorithm based on the management/increase of a small number of the directional views of the images, utilising geometrical relations is an effective process to reduce data in itself. But it is worth using the already known image compression methods with the directional views of the images in order to achieve better compression. The decompression unit 220 is a multi-channel unit, operating according to a known standard, e.g. such as MPEG2, MPEG4, Wavelet etc. The decompression unit 220 decompresses the image content of the input compressed data flow and forwards the images to the input of the 3D unit 240.

In addition, the computer 200 naturally controls all the functions of the apparatus, from the switch-on of the power supply 85 of the light source 80, through controlling of the cooling, to the display menu. The apparatus can carry out self-diagnostics and may perform certain servicing corrections and adjustments controlled via an IP connected to the Internet, either through a telephone line or via a computer network, if required.

What is claimed is:

1. An apparatus for displaying 3D images, the apparatus comprising
   a, a screen for direction selectively transmitting and/or reflecting light,
   b, a screen illuminating system, the screen illuminating system comprising
   c, modules for generating light beams, the light beams being associated to multiple different points of the screen, and being associated to different emitting directions of the points of the screen, and further
   d, the screen providing divergence to the transmitted or reflected light, according to the angle between neighbouring emitting directions, and the apparatus further comprising
   e, a control system for controlling the modules, characterised in that
   f, the modules further comprise a two-dimensional display, and
   g, an optical system for simultaneously imaging the individual pixels of the display onto the screen, where
   h, the display pixels on the two-dimensional display associated to the different points on the screen and corresponding to the different emitting directions associated to the different screen points generate substantially simultaneously light beams with different co-ordinates but substantially without emitting direction information, and
   i, the imaging optics associated to the display substantially simultaneously images the light beams generated by the display pixels with different co-ordinates into different emitting directions or imaging directions.

2. The apparatus of claim 1, characterised in that
   a, the screen (20) transmits the incoming light beams ($L_d$) substantially without changing their direction or reflects the light beams in a mirror-like manner or retroreflectively,
   b, the modules are realised as means for generating light beams ($L_e$) being emitted in different directions from the screen points (P) and for projecting light beams ($L_d$) with different intensity and/or colour towards the individual screen points (P) from different directions (D), where in the means for projecting light beams ($L_d$) towards the screen points (P)
   c, the two dimensional display (50) is realised as an image generating means for generating light beams ($L_c$) to be projected towards different directions, where the light beams ($L_c$) associated to the different projection directions are generated with different pixels ($C_d$) of the two dimensional display (50), and the imaging optics comprises
   d, means for deflecting with a given angle the light beams ($L_c$) incoming onto the imaging optics as a function of the incoming co-ordinates, said means preferably being an optical lens, and further the screen illuminating system comprises
   e, means for generating substantially parallel, and—as a function of the spatial co-ordinates substantially homogenous light beams for illuminating the image generating means, and further
   f, the modules (45) are positioned in optically equivalent positions, periodically shifted relative to each other and to the screen (20), so that
   g, the light beams ($L_c$) are deflected by the optical deflecting means towards the different deflection directions (D) and towards the appropriate screen points (P), according to the mutual position of the relevant modules (45) and the screen (20), the light beams ($L_c$) being coded with the pixels of a composite image—preferably by modulating with colour—and intensity information—, where the composite image is generated by the image generating means.

3. The apparatus of claim 1, characterised in that the two-dimensional display is a liquid crystal micro-display, particularly transmission or reflection mode LC microdisplay, LED or OLED display, or micromechanical device, particularly micro-mirror matrix, active optical grating or other light valve matrix.

4. The apparatus of claim 1, characterised in that the two-dimensional displays create a composite image without vertical parallax information, and the modules are arranged in horizontal lines, and further the horizontal divergence ($\delta y$) of the screen corresponds to the angle between light beams ($L_d$) projected onto the same screen point from neighbouring modules, and the vertical divergence ($\delta y$) of the screen corresponds to the desired vertical viewing range.

5. The apparatus of claim 4, characterised in that the screen providing the divergence has a horizontally retroreflective surface, particularly a surface with vertically oriented prism structure.

6. The apparatus of claim 1, characterized in that the modules are arranged in multiple parallel lines, and shifted relative to each other in a direction parallel to the lines.

7. The apparatus of claim 1, characterised in that the illuminating system of the image generating means comprises multiple means for generating substantially parallel light beams ($L_c$), the means for generating parallel light beams being illuminated by a common light source (80).

8. The apparatus of claim 7, characterised by means for modulating the light of the common light source, preferably a rotating colour filter disk, or other light shutter, and the light of the common light source is guided to the individual modules with a light guide or optical fibre.

9. The apparatus of claim 1, characterised by comprising multiple light sources, preferably LEDs, particularly a LED chip (170) matrix provided with multicolour LEDs, or multiple separate LEDs, which are associated to the individual modules.

10. The apparauus of claim 9, characterised in thaat the LEDs are privided with a beam shaping adapter, preferaboy a microlens matrix or a reflecting light integrating/concentrating element (65).

11. The apparatus of claim 1, characterised in that the screen is an optical plate for providing divergence to the direction selectively transmitted and/or reflected light beams, the angle of the divergence ($\delta x, \delta y$) corresponding to the angle between the light beams originating from neighbouring modules (45) and emitting from the same screen point (P), in the plane defined by the neighbouring modules (45) and the screen point (P).

12. The apparatus of claim 11, characterised in that the divergence of the optical plate is done with a lens system (30) or with a holographic layer (33).

13. The apparatus of claim 1, characterised in that the modules are arranged along a straight section parallel to the screen.

14. The apparatus of claim 1, characterised in that the modules are arranged along a section of a circle, and the screen is a cylindrical or spherical surface substantially concentric with the circle of the modules.

15. The apparatus of claim 1, characterised in that the controlling means is realised as a computer, so that
   a, the apparatus functions as a network device according to standards known per se, where the apparatus b, processes the input signals according to different standards, converted onto a computer data bus.

16. The apparatus of claimed 15, characterised in that the controlling means autonomously stores and processes images, preferably for the purposes of image compression, optimisation according to viewing position, realistic display modified according to the surrounding illumination.

17. A method for the displaying of 3D images, comprising the steps of
   a, generating light beams ($L_d$) associated to multiple different points (P) of a screen (20), the light beams ($L_d$) creating different views associated to different emitting directions (E) of the individual screen points (P), and
   b, projecting the light beams ($L_d$) onto a direction selectively transmitting and/or reflecting screen (20), the screen (20) providing divergence ($\delta x$) corresponding to the angle between two neighbouring emitting directions (E), characterised by
   c, generating substantially simultaneously light beams ($L_c$) substantially without emitting direction information with pixels ($C_d$) of a two-dimensional display (50), the pixels ($C_d$) having different co-ordinates, the light beams ($L_c$) being associated to the different points (P) on the screen (20) and corresponding to the different emitting directions (E) of the screen points (P), and
   d, imaging substantially simultaneously the light beams ($L_c$) generated by the display pixels ($C_d$) with different co-ordinates into different deflecting directions (D), the imaging being performed as a function of the co-ordinates of the pixels ($C_d$) generating the light beams ($L_c$).

18. The method of claim 17, characterised in that the light beams creating the different views are generated with the following steps:
   a, light having different intensity and/or colour is emitted into different emitting directions from the points of the screen, where
   b, the light beams emitted from the screen points into different directions are generated by projecting light beams with different intensity and/or colour towards the individual screen points from different directions, and transmitting the light beams substantially without changing their direction or reflecting the light beams from the screen substantially maintaining the direction, while providing the appropriate divergence to the light beams, and further
   c, the light beams projected in different directions towards the screen points are created by generating a composite image, the composite image comprising image details, the image details corresponding to the images to be projected into different directions from the different screen points, and
   d, illuminating the composite images with substantially parallel light beams, generating substantially parallel light beams being modulated with the intensity and/or colour information of the individual image details, and
   e, projecting the substantially parallel light beams being thus modulated as a function of the spatial co-ordinates onto an optical deflecting means, preferably onto an imaging optics, and
   f. projecting with the optical deflecting means the substantially parallel light beams being modulated with the image details of the composite image towards the appropriate screen points, by deflecting the light beams into different directions, according to the position of the relevant image details on the composite image, and the imaging properties of the optical deflecting element, the appropriate screen points being defined by the mutual position of the relevant optical deflecting means and the screen.

19. The method of claim 17, characterised in that the product of the number of the image generating means and the number of their pixels equals the product of the number of the screen points and the number of the emitting directions associated to the screen points.

20. The method of claim 17, characterised by generating one view of the 3D image which is seen from each single direction by several image generating means.

21. The method of claim 17, characterised by generating a 3D image without vertical parallax from multiple vertical image strips, the image strips being generated by the individual image generating means.

22. The method of claim 17, characterised by generating with one image generating means multiple image details corresponding to multiple of the number of the viewing directions associated to the individual screen points, and associating fewer image generating means than the number of the screen points, so that with one image generating means image details are generated which are associated to substantially equal or neighbouring viewing directions of several screen points.

23. The method of claim 17, characterised by generating with one image generating means image details corresponding to the number of different viewing directions of each screen point, and using as many image generating means associated to one horizontal screen line as the number of the screen points in that screen line.

24. The method of claim 17, characterised by using pixels with independent light emitting properties in the image generating means.

25. The method of claim 17, characterised by illuminating the image generating means with separate light sources.

26. The method of claim 17, characterised by illuminating multiple image generating means with a common light source.

27. The method of claim 17, characterised in creating a divergence of the light beams, the light beams being direction selectively transmitted through the screen and/or reflected from the screen, the angle of the divergence corresponding to the angle between the light beams being emitted from the same screen point, in the plane determined by the light beams emitted from that screen point.

28. An apparatus for displaying 3D images, the apparatus comprising
   a, a screen for direction selectively transmitting and/or reflecting light,
   b, a screen illuminating system, the system comprising
   c, modules for generating light beams, the light beams being associated to multiple different points of the screen, and being associated to different emitting directions of the points of the screen, and further
   d, the screen providing divergence to the transmitted or reflected light, according to the angle between neighbouring emitting directions, characterised in that
   f, the modules further comprise a two-dimensional image, and
   g, an optical system for simultaneously imaging the individual image points of the image onto the screen, where
   h, the image points of the two-dimensional image associated to the different points on the screen and corresponding to the different emitting directions associated to the different screen points generate substantially simultaneously light beams with different co-ordinates but substantially without emitting direction information, and i, the imaging optics associated to the display substantially simultaneously images the light beams generated by the image points with different co-ordinates into different emitting directions or imaging directions.

29. The apparatus of claim 28, characterised in that the image is contained on a slide strip (transparency strip) or other image carrier medium.

30. The apparatus of claim 28, characterised by comprising multiple light sources associated to the individual modules, preferably LED or incandescent lamp, or comprising a common light source illuminating the images, preferably a light tube.

31. The apparatus of claim 28, characterised in that the imaging optics associated to the images is realised as an optical plate embodied in a single unit, preferably as a lens matrix.

* * * * *